(12) United States Patent
Tang et al.

(10) Patent No.: US 7,738,037 B2
(45) Date of Patent: Jun. 15, 2010

(54) METHOD AND APPARATUS FOR ELIMINATING MOTION ARTIFACTS FROM VIDEO

(75) Inventors: Che Wing Tang, Baldwin Park, CA (US); Dung Duc Truong, El Monte, CA (US)

(73) Assignee: RGB Systems, Inc., Anaheim, CA (US)

( * ) Notice: Subject to any disclaimer, the term of this patent is extended or adjusted under 35 U.S.C. 154(b) by 742 days.

(21) Appl. No.: 10/976,669

(22) Filed: Oct. 29, 2004

(65) Prior Publication Data

US 2005/0062891 A1    Mar. 24, 2005

Related U.S. Application Data

(63) Continuation of application No. 09/738,281, filed on Dec. 14, 2000, now Pat. No. 6,839,094.

(51) Int. Cl.
*H04N 5/08* (2006.01)
*H04N 5/14* (2006.01)
*H04N 7/01* (2006.01)
*H04N 11/20* (2006.01)

(52) U.S. Cl. .................. 348/441; 348/607; 348/448; 348/452; 348/458; 348/700; 348/96

(58) Field of Classification Search .................. None
See application file for complete search history.

(56) References Cited

U.S. PATENT DOCUMENTS 4,881,125 A    11/1989   Krause 5,317,398 A *  5/1994   Casavant et al. ............ 348/570

(Continued)

FOREIGN PATENT DOCUMENTS

EP        1065879        1/2001

(Continued)

*Primary Examiner*—Brian P Yenke
(74) *Attorney, Agent, or Firm*—The Hecker Law Group, PLC

(57) ABSTRACT

A method and apparatus for detecting and correcting motion artifacts in interlaced video signal converted for progressive video display. A correction is applied where interlaced video material is determined to originate from film source, thereby having been converted to video using a process known as 3-2 pulldown. Where the video material is not a result of the 3-2 pulldown process, a check is made for the presence of "pixel motion" so that corrections may be applied to smooth out the pixel motion. To determine 3-2 pulldown or field motion, a video field is compared to the field prior to the previous field to generate field error. Field errors are generated for five consecutive fields and a local minimum error repeated every five fields indicate the origination of the video material from film source using the 3-2 pulldown process. Upon confirmation of 3-2 pulldown, the video material is modified to correct for the mixing of two film frames into one interlaced video frame by assuring that the two fields of the de-interlaced video frame contain data from the same film frame. Where the video material did not originate from a film source, but pixel motion is detected, the pixel motion is smoothed out by an averaging method. The odd and even fields of the resulting video data are subsequently combined to form a progressive video material.

10 Claims, 13 Drawing Sheets

U.S. PATENT DOCUMENTS

| | | | |
|---|---|---|---|
| 5,329,309 A | | 7/1994 | Doricott et al. |
| 5,337,154 A | * | 8/1994 | Dorricott et al. ............ 348/448 |
| 5,446,497 A | | 8/1995 | Keating et al. |
| 5,452,011 A | | 9/1995 | Martin et al. |
| 5,508,750 A | | 4/1996 | Hewlett et al. |
| 5,550,592 A | | 8/1996 | Markandey et al. |
| 5,606,373 A | | 2/1997 | Dopp et al. |
| 5,821,991 A | | 10/1998 | Kwok |
| 5,828,786 A | * | 10/1998 | Rao et al. ................... 382/236 |
| 5,844,618 A | | 12/1998 | Horiike et al. |
| 5,852,473 A | | 12/1998 | Horne et al. |
| 5,872,600 A | * | 2/1999 | Suzuki ....................... 348/459 |
| 5,929,902 A | | 7/1999 | Kwok |
| 5,930,445 A | * | 7/1999 | Peters et al. ................... 386/52 |
| 5,943,099 A | * | 8/1999 | Kim ........................... 348/448 |
| 6,055,018 A | * | 4/2000 | Swan .......................... 348/448 |
| 6,058,140 A | | 5/2000 | Smolenski |
| 6,144,410 A | * | 11/2000 | Kikuchi et al. .............. 348/441 |
| 6,157,412 A | * | 12/2000 | Westerman et al. ......... 348/558 |
| 6,201,577 B1 | * | 3/2001 | Swartz ........................ 348/558 |
| 6,236,806 B1 | * | 5/2001 | Kojima et al. ............... 386/131 |
| 6,282,245 B1 | * | 8/2001 | Oishi et al. ............. 375/240.28 |
| 6,340,990 B1 | * | 1/2002 | Wilson ....................... 348/448 |
| 6,380,978 B1 | * | 4/2002 | Adams et al. ............... 348/452 |
| 6,408,024 B1 | * | 6/2002 | Nagao et al. ........... 375/240.01 |
| 6,411,341 B1 | * | 6/2002 | De Haan et al. ............. 348/714 |
| 6,414,719 B1 | * | 7/2002 | Parikh ........................ 348/448 |
| 6,459,455 B1 | * | 10/2002 | Jiang et al. .................. 348/452 |
| 6,469,745 B1 | * | 10/2002 | Yamada et al. .............. 348/558 |
| 6,525,774 B1 | * | 2/2003 | Sugihara ..................... 348/459 |
| 6,542,199 B1 | * | 4/2003 | Manbeck et al. ............ 348/459 |
| 6,559,890 B1 | * | 5/2003 | Holland et al. .............. 348/441 |
| 6,563,550 B1 | * | 5/2003 | Kahn et al. .................. 348/700 |
| 6,597,402 B1 | * | 7/2003 | Butler et al. ................. 348/447 |
| 6,630,961 B1 | * | 10/2003 | Shin et al. ................... 348/448 |
| 6,670,996 B2 | * | 12/2003 | Jiang .......................... 348/558 |
| 6,700,622 B2 | * | 3/2004 | Adams et al. ............... 348/448 |
| 7,203,238 B2 | * | 4/2007 | Liu et al. ............... 375/240.17 |
| 2002/0027610 A1 | * | 3/2002 | Jiang et al. .................. 348/448 |
| 2002/0149703 A1 | * | 10/2002 | Adams et al. ............... 348/700 |
| 2003/0098924 A1 | * | 5/2003 | Adams et al. ............... 348/448 |
| 2003/0193614 A1 | * | 10/2003 | Holland et al. .............. 348/441 |

FOREIGN PATENT DOCUMENTS

| | | |
|---|---|---|
| JP | 09 322126 | 12/1997 |
| WO | WO 99/18727 | 4/1999 |
| WO | WO 99/20040 | 4/1999 |
| WO | WO 00/38419 | 6/2000 |

* cited by examiner

METHOD AND APPARATUS FOR ELIMINATING MOTION ARTIFACTS FROM VIDEO

This application is a continuation of U.S. patent application Ser. No. 09/738,281, filed on Dec. 14, 2000, entitled "Method and Apparatus for Eliminating Motion Artifacts from Video," issued as U.S. Pat. No. 6,839,094 on Jan. 4, 2005, the disclosure of which is incorporated in its entirety by reference herein.

BACKGROUND OF THE INVENTION

1. Field of the Invention

This invention relates to the field of video compensation. More specifically the invention relates to detecting and correcting motion artifacts in video source signals.

2. Background Art

In North America the video displayed across a normal television screen is an interlaced video signal, which is a standard called NTSC (National Television Standards Committee) video. This is not the same video displayed across most computer screens since computer screens use mostly non-interlaced display devices.

Interlaced video simply means that for each picture frame displayed on the television screen, there are two video fields being displayed one after the other. The first field is commonly known as the odd field, and the second field as the even field. Since the interlaced video frame is displayed at 30 frames (i.e. 60 fields) every second, the odd field is displayed in the first one sixtieth (1/60) of a second while the even field is displayed in the second one sixtieth of a second.

Each display monitor comprises a series of horizontal and vertical lines. For example, the resolution of an NTSC television monitor is approximately 858 horizontal counts by 525 vertical lines. Actual resolution excluding blanking lines is 720 by 480. In a television display, the odd field of the interlaced video signal is displayed on the odd numbered (i.e. 1, 3, 5, . . . ) horizontal lines of the monitor and the even field is displayed on the even numbered (i.e. 0, 2, 4, 6, . . . ) horizontal lines. Thus, at brief instances of time, alternating lines of the television screen do not have any video display (i.e. are blank). However, because the display rate is faster than can be perceived by the human eye, a viewer is not able to discern the blanked lines.

Video is a linear medium like audio, unlike photography or film. A film camera captures the entire frame of a picture in a single instant. But video was originally designed to be transmitted over the air. Video images must be broken up and transmitted or recorded as a series of lines, one after the other. At any given millisecond, the video image is actually just a dot speeding across the face of the monitor.

One problem with NTSC is that it is an analog system. In non-analog systems such as computer video, numbers represent colors and brightness. But with analog television, the signal is just voltages, and voltages are affected by wire length, connectors, heat, cold, videotape, and other conditions. Digital data does not have such problematic characteristics. Thus, it would be advantageous to store or transmit video signals in a digital format.

Interlaced NTSC video must be converted to non-interlaced (i.e. progressive) video for display on devices such as computer screens. The conversion is generally performed in the digital domain therefore, the NTSC video signal must first be converted from analog to digital and then the odd and even fields are combined into one complete non-interlaced video frame such that the complete frame is displayed in one scan of the video signal.

Analog video inputs may be available in any of the different color models such as the C-Video, S-Video, or YUV (or YIQ). A color model (also color space) facilitates the specification of colors in some standard, generally accepted way (e.g., RGB). In essence, a color model is specification of a 3-Dimensional coordinate system and a subspace within that system where each color is represented by a single point.

The C-Video or Composite Video is a type of video signal in which all information—the red, blue, and green signals (and sometimes audio signals as well)—are mixed together. This is the type of signal used by televisions in the United States. The S-Video, short for Super-Video, is a technology for transmitting video signals over a cable by dividing the video information into two separate signals: one for color (chrominance), and the other for brightness (luminance). When sent to a television, this produces sharper images than composite video, where the video information is transmitted as a single signal over one wire. This is because televisions are designed to display separate Luminance (Y) and Chrominance (C) signals. The terms Y/C video and S-Video are used interchangeably.

The YUV or YIQ Color model is used in commercial color TV broadcasting. The Y generally stands for intensity (luminance, brightness) and thus provides all the information required by a monochrome television. The other two components carry the color (chrominance) information. Each model component may be represented in various bit depths. For example, the brightness component may range from 1-bit (black and white), to over 8-bit (usual, representing 256 values of gray) to 10- or 12-bit. Note that brightness, luminance, and intensity are used interchangeably in this specification.

Whatever the color model of the input, the incoming video signal may need to be converted to progressive video for display on non-interlaced devices. Video signals originate from various sources. For example, a video material may have originated from a film source, or may have been recorded using an interlaced video camera. In recent years there has been a proliferation of film material being converted to NTSC video for display on regular television. For example, movies stored on videotape usually originated from a film counterpart. Film data is shot at twenty-four frames a second (24 frames/sec) while NTSC data is at 30 frames a second (i.e. 60 fields/second) therefore the film data must be scaled in frequency from 24 frames/second to the NTSC rate of 30 frames/second (i.e. 60 fields/sec). To achieve this, a method called 3-2 pulldown is employed. Thus, 3-2 pulldown is a method for transferring film material that is at 24 frames per second to NTSC video at 30 frames per second. That is, 24 film frames in 30 video frames requires that four film frames be converted to five video frames (i.e. 24 to 30 every second).

FIG. 1 is an illustration of the mechanics of 3-2 pulldown. In this illustration, row 100 contains film frames f1-f7 that are mapped into row 106 comprising interlaced video frames v1-v8. Each interlaced video frame comprises an odd and an even field shown in row 104. For example, interlaced video frame v1 comprises interlaced video fields 1o and 1e, interlaced video frame v2 comprises interlaced video fields 2o and 2e, and so on for all the video frames up to v8. Row 102 represents the field frame numbers that are mapped into the respective video fields. As shown in row 102, film frame 1 (i.e. f1) is mapped into video fields 1o, 1e, and 2o; film frame 2 (i.e. f2) is mapped into video fields 2e and 3o; film frame 3 (i.e. f3) is mapped into video fields 3e, 4o, and 4e; film frame 4 (i.e. f4) is mapped into video fields 5o and 5e. This process continues whereby one film frame is mapped into three video fields, followed by the second film frame being mapped into the next two video frames. This three-two cycle repeats itself hence the process known as 3-2 pulldown.

Further, in this illustration of the 3-2 pulldown phenomenon, film frames f1-f4 are mapped into video frames v1-v5. Film frames f1-f4 and video frames v1-v5 must occur in the same $\frac{1}{6}^{th}$ of a second to preserve the length of the material being converted. As shown, film frame f1 is mapped into the odd and even fields of video frame v1 and into the odd field of video frame v2, and film frame f2 is mapped into the even field of video frame v2 and into the odd field of video frame v3. This results in video frame v2 having film frame f1 in its odd field and film frame f2 in its even field, and video frame v3 having film frame f2 in its odd field and film frame f3 in its even field. Thus video frames v2 and v3 are composed of mixed film frames. The phenomenon known as field motion, illustrated by a "Yes" in row 108, occurs in video frames with mixed film frames.

When viewed on an NTSC television, the video generated from the 3-2 pulldown is visually tolerable to the viewer because television displays a single field at a time hence the video appears continuous. However, if the NTSC data originating from film source is subsequently converted to progressive video for display on a computer display, for example, a problem known as "field motion" may occur. Field motion occurs because each progressive video frame is displayed one at a time.

One method of generating progressive video material is to combine the odd and even fields of an interlaced video material to generate a frame of the progressive video material. Using a progressive material generated from film material, for example, progressive video frame v1 comprises film frame f1 in its odd and even lines. Progressive video frame v2 comprises film frame f1 in its odd lines and film frame f2 in its even lines. If film frames f1 and f2 are shot at different times and if an object has moved during that time, the object may be at different locations on film frames f1 and f2. Now, if the progressive video frame v2 is viewed in still frame, the object will be distorted. This distortion is what is known as "field motion". The distortion becomes more pronounced as the video material is scaled-up to fit higher resolution display devices.

Video Scaling

Video scalers are employed to change the size of an original video signal to fit a desired video output device. A scaler changes the size of an image without changing its shape, for instance, when the image size does not fit the display device. Therefore, the main benefit of a scaler is its ability to change its output rate to match the abilities of a display device. This is especially advantageous in the case of digital display devices because digital display devices produce images on a fixed matrix and in order for a digital display device to provide optimal light output, the entire matrix should be used.

Since a scaler can scale the output both horizontally and vertically, it can change the "aspect ratio" of an image. Aspect ratios are the relationship of the horizontal dimension to the vertical dimension of a rectangle. Thus, when included as part of a graphics switch, a scaler can adjust horizontal and vertical size and positioning, for a variety of video inputs. For example, in viewing screens, the aspect ratio for standard TV is 4:3, or 1.33:1; HDTV is 16:9, or 1.78:1. Sometimes the ":1" is implicit making TV=1.33 and HDTV=1.78. So, in a system with NTSC, PAL or SECAM inputs and a HDTV type of display, a scaler can take the standard NTSC video signal and convert it to a 16×9 HDTV output at various resolutions (e.g. 480 p, 720 p, and 1080 p) as required to fit the HDTV display area exactly.

Scaling is often referred to as "scaling down" or "scaling up." An example of "scaling down" is when a 640×480 resolution TV image is scaled for display as a smaller picture on the same screen, so that multiple pictures can be shown at the same time (e.g. as a picture-in-picture or "PIP"). Scaling the original image down to a resolution of 320×240 (or ¼ of the original size) allows four input TV resolution pictures to be shown on the same output TV screen at the same time. An example of "scaling up" is when a lower resolution image (e.g. 800×600=480,000 pixels) is scaled for display on a higher resolution (1024×768=786,432 pixels) device. Note that the number of pixels is the product of the two resolution numbers (i.e. number of pixels=horizontal resolution×vertical resolution). Thus, when scaling up, pixels must be created by some method. There are many different methods for image scaling, and some produce better results than others.

A scan converter is a device that changes the scan rate of a source video signal to fit the needs of a display device. For instance, a "video converter" or "TV converter" converts computer-video to NTSC (TV), or NTSC to computer-video. Although the concept seems simple, scan converters use complex technology to achieve signal conversion because computer signals and television signals differ significantly. As a result, a video signal that has a particular horizontal and vertical frequency refresh rate or resolution must be converted to another resolution or horizontal and vertical frequency refresh rate. For instance, it requires a good deal of signal processing to scan convert or "scale" a 15.75 KHz NTSC standard TV video input (e.g. 640×480) for output as 1024×768 lines of resolution for a computer monitor or large screen projector because the input resolution must be enhanced or added to in order to provide the increased capability or output resolution of the monitor or projector. Because enhancing or adding pixels to he output involves reading out more frames of video than what is being read in, many scan converters use a frame buffer or frame memory to store each incoming input frame. Once stored, the incoming frame can be read out repeatedly to add more frames and/or pixels.

Similarly, a scan doubler (also called "line doubler") is a device used to change composite interlaced video to non-interlaced component video, thereby increasing brightness and picture quality. Scan doubling is the process of making the scan lines less visible by doubling the number of lines and filling in the blank spaces. Also called "line-doubling". For example, a scan doubler can be used to convert an interlaced, TV signal to a non-interlaced, computer video signal. A line doubler or quadrupler is typically very useful for displaying images on TV video or TFT flat panel screens.

Because of the problems exigent in current conversion systems, there is a need for a system that enhances or improves the quality of video images by correcting the effects caused by converting the video signal from one type to another. For instance, current systems lack an effective way to eliminate field motion from interlaced video material during the conversion to progressive video.

SUMMARY OF THE INVENTION

The invention defines a method and apparatus for detecting and correcting motion artifacts in interlaced video signal converted for progressive video display. An embodiment of the invention provides a method and apparatus for enhancing or improving the quality of video images by correcting the effects caused by converting the video signal from one type to another. For instance, an embodiment of the invention entails determining whether interlaced video material originated from a film source, thereby having been converted to video using a process known as 3-2 pulldown, and then correcting the interlaced video material to counteract the effect of the 3-2 pulldown. If the video material is concluded to originate from video because of inadequate confirmation of the 3-2 pulldown phenomenon, a check is made for the presence of "pixel motion" so that other necessary corrections may be applied. After appropriate corrections are applied, the resulting de-interlaced video material may be additionally processed using processes such as video scaling to generate a desired output resolution.

A video field is compared to the field prior to the previous field to generate field error used in determining either the origination of the video material from a film source (i.e. 3-2 pulldown process) or the existence of "pixel motion". Field errors are generated for five consecutive fields and a local minimum repeating every five fields indicate the origination of the video material from film source using the 3-2 pulldown process.

In one embodiment, upon confirmation of 3-2 pulldown, the video material is subsequently modified to correct for the mixing of two film frames into one interlaced video frame by assuring that the two fields of the de-interlaced video frame contain data from the same film frame. Where the video material did not originate from a film source, but pixel motion is detected, the pixel motion is smoothed out by an averaging method. The odd and even fields of the resulting video data are subsequently combined to form a progressive video material.

DETAILED DESCRIPTION OF THE INVENTION

Figure 1:
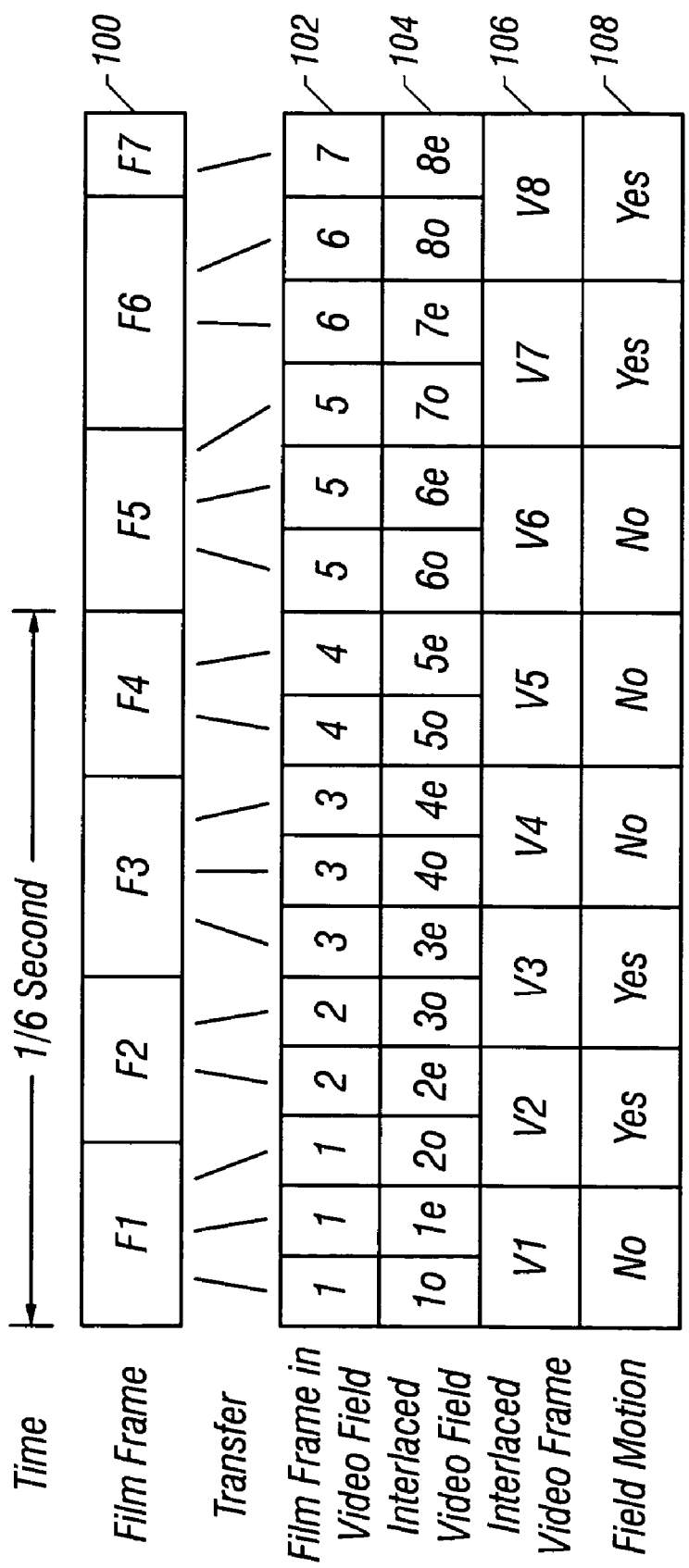
FIG. 1 is an illustration of the mechanics of 3-2 pulldown process where film material is converted to interlaced video material.

An embodiment of the invention comprises a method and apparatus for detecting and correcting motion artifacts in interlaced video signal converted for progressive video display. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

An embodiment of the invention provides a method and apparatus for enhancing or improving the quality of video images by correcting the effects caused by converting the video signal from one type to another. For instance, one embodiment of the invention eliminates field motion from interlaced video material during conversion to progressive video. An embodiment of the present invention entails determining whether the interlaced video material originated from a film source and was therefore converted to video using a process known as 3-2 pulldown. If the film source was converted to video using the 3-2 pulldown technique, the invention corrects the effects of the 3-2 pulldown. If the video material is not a result of the 3-2 pulldown process, a check is made for the presence of "pixel motion" so that other corrections may be applied. After appropriate corrections are applied, the resulting de-interlaced video material is unchanged in both length and rate. Additional processing, such as video scaling to a desired output resolution, may subsequently be performed using the de-interlaced video material.

Because determination of 3-2 pulldown or "field motion" requires comparing different video fields to determine repeat fields, incoming video signals are digitized and stored in memory buffers. One way of finding repeat fields is to compare each field to the field prior to the previous field. Every other field in interlaced video material is of the same type (i.e. odd or even) and when two adjacent fields of the same type are identical (e.g. 1 odd—1 even—1 odd), the video material most likely originated from the same film frame. Identical adjacent fields of the same type occur every fifth field in a 3-2 pulldown video.

In one embodiment, corrections to the video material are applied in real time while the resulting progressive video is actively displayed. Therefore, a reliable algorithm to detect, confirm, and correct any video anomaly is employed during the display process. For example, one or more embodiment uses the error in five successive fields to detect the presence of 3-2 pulldown. After detection, the 3-2 pulldown must be confirmed for at least one additional processing cycle. Thus, since the repeat film frame in a 3-2 pulldown occurs every five video fields, the fifth field following the detection of 3-2 pulldown should show a repeat field to declare confirmation. Different confirmation techniques may be employed in other embodiments such as: two out of three detections, for example, or even three out of three. The invention also contemplates the use of other confirmation combinations so long such combinations reliably confirm the presence of 3-2 pulldown.

Once 3-2 pulldown is detected and confirmed, correction to the video material is performed in real time. Confirmation of 3-2 pulldown continues while display of the video material progresses in real time, with appropriate correction applied for the effect of the 3-2 pulldown. When the confirmation of 3-2 pulldown fails, the correction ceases and the process reverts to handling the video material as data not originating from film source.

Figure 2:
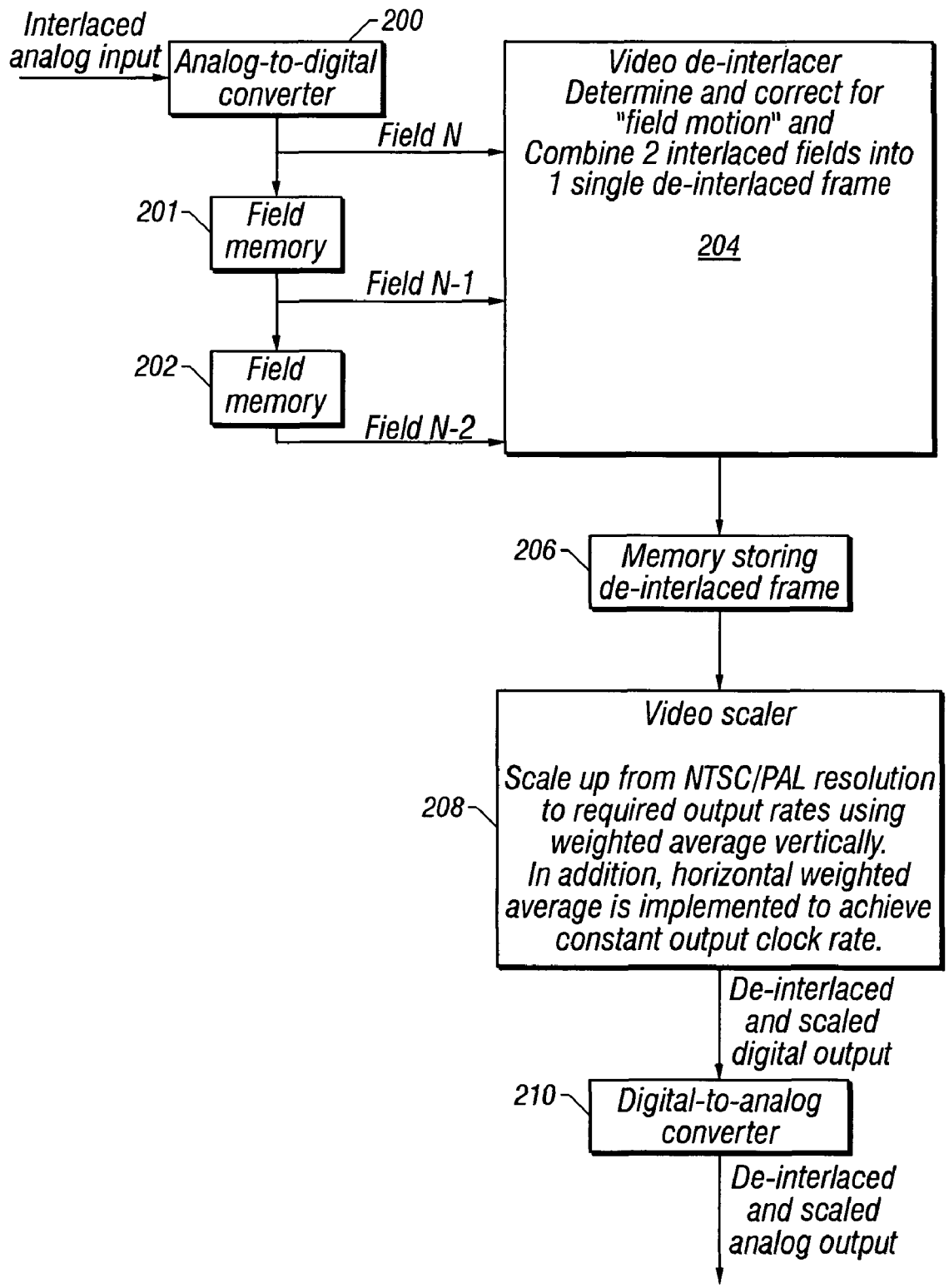
FIG. 2 is a flow diagram of a video conversion process according to an embodiment of the present invention.

FIG. 2 is a flow diagram of a video conversion process according to an embodiment of the present invention. For example, an incoming analog NTSC signal, which is interlaced video signal, is converted to digital data at Analog-to-Digital converter 200 before processing of the video material can proceed. Motion artifacts detection and correction in an embodiment of the present invention are performed in the digital domain. Processes identified in blocks 201 through 208 will be discussed in terms of digital sampling intervals. An assumption, for purposes of example only, is that one complete sample includes conversion of a full video field data in Analog-to-Digital converter block 200 and completion of processes in blocks 201 through block 208.

After conversion to digital data in block 200, the digital data comprising an entire video field is stored in field memory 201 at the end of the every sample interval. However, before data is stored in field memory 201, contents of memory 201 are first moved to field memory 202. Therefore, assuming analog-to-digital conversion of a video field occurred at sample interval "N" in block 200, then during sample interval "N", data in field memory 201 is data from the previous sample "N-1" and data in field memory 202 is data from the sample prior to the previous sample "N-2". In this fashion, data sent to video de-interlacer block 204 comprises field data from three consecutive samples "N", "N-1", and "N-2" which represents data from three consecutive video fields "N", "N-1", and "N-2".

Figure 3:
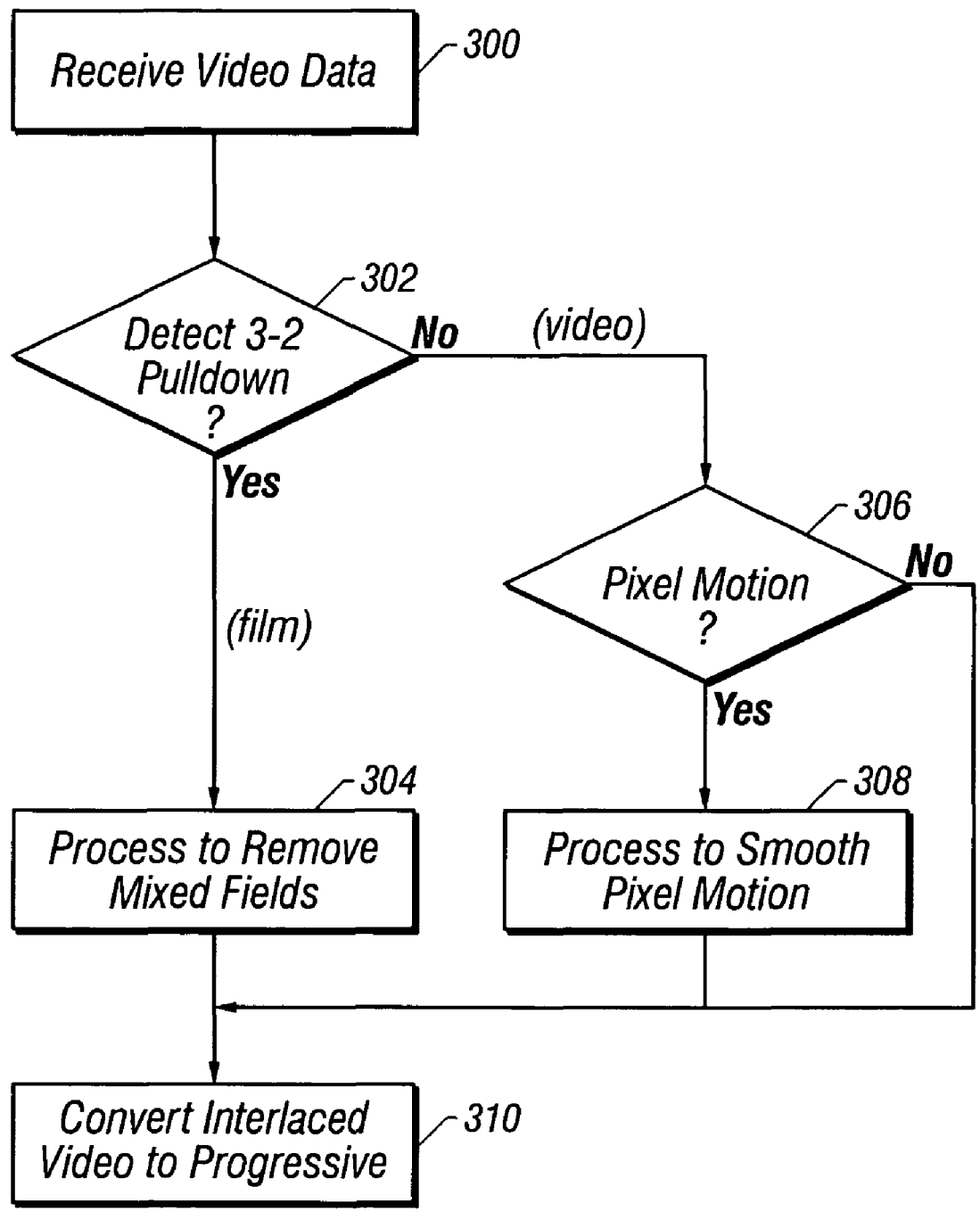
FIG. 3 is a flow diagram of the video processing according to an embodiment of the present invention.

In video de-interlacer block 204, processing is performed on the video data as shown in FIG. 3. Referring to FIG. 3, at step 300 video field data is received from the three consecutive fields "N", "N-1", and "N-2". Field errors for five consecutive fields are computed and used for a determination, at step 302, whether the original video signal originated from film source by using the five consecutive fields method discussed in FIG. 4, below. If the determination is made that the data was from a film source, film mode is declared and processing is performed to remove mixed fields from the data at step 304. If, however, the data was not from a film source, video mode is declared and a check is made at step 306 for the presence of "pixel motion". Pixel motion occurs when the difference between the pixel intensities of the current pixel in field "N" and a corresponding pixel at field "N-2" is greater than a predetermined threshold. Step 306 is optional and is necessary if additional processing is desired during conversion from interlaced to non-interlaced signal to smooth the video material. For example, a video material that did not originate from a film source may have indications of "pixel motion" due to use of interlaced camera during generation of the video.

Figure 10:
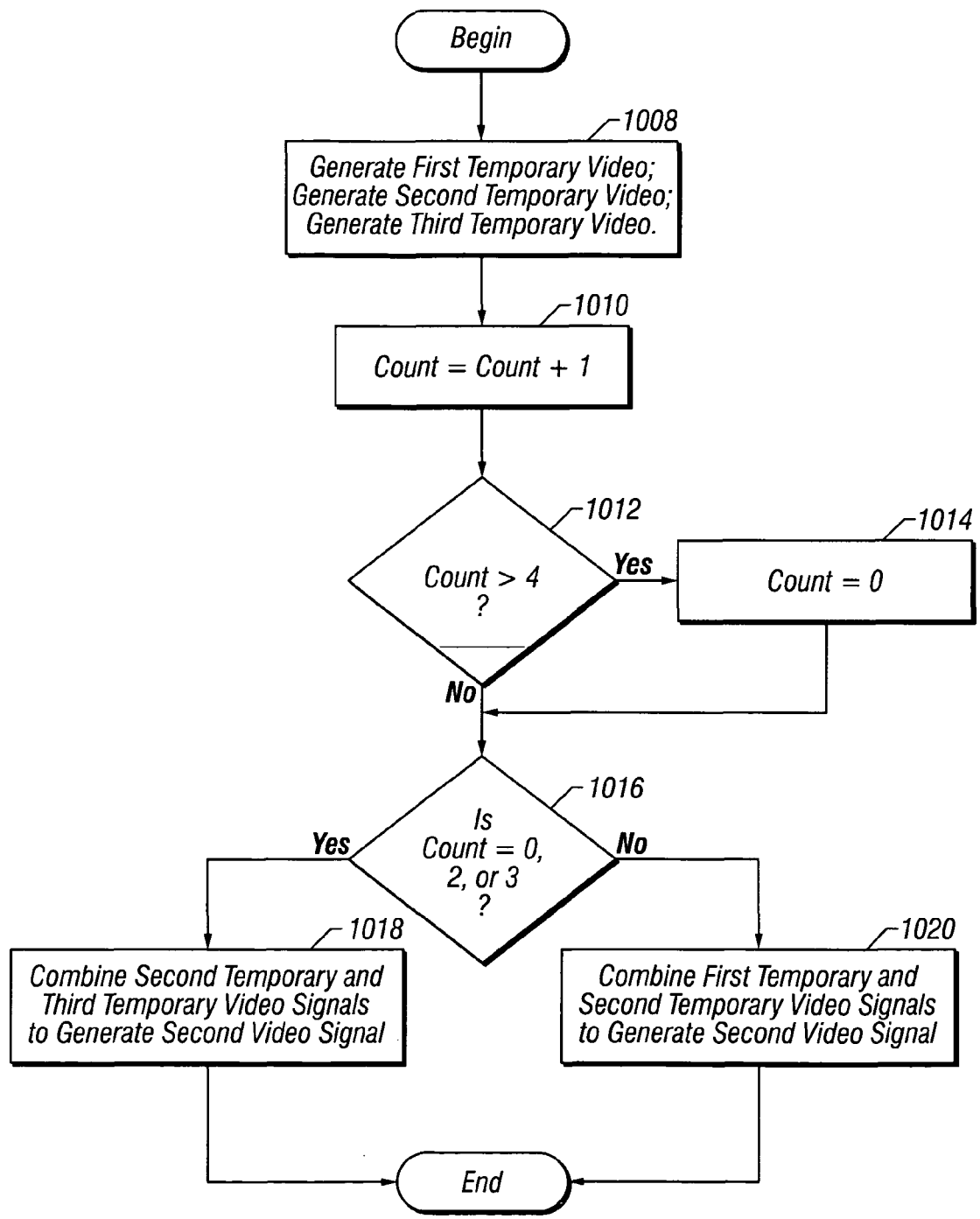
FIG. 10 is a flow diagram illustrating the processing of 3-2 pulldown video in accordance with an embodiment of the invention.

Processing in step 304 is further discussed using the flow diagram of FIG. 10. As illustrated, three temporary video signals are generated from the received video signal (i.e. first video signal) in block 1008. A first temporary video signal may be the output of an analog-to-digital conversion process (e.g. FIELD N of FIG. 2); a second temporary signal is the first temporary video signal delayed by one frame (e.g. FIELD N-1 of FIG. 2); and a third temporary signal is the second temporary video signal delayed by one frame (e.g. FIELD N 2 of FIG. 2).

At block 1010, a counter (frame counter) is incremented. The counter is used to keep track of the video fields and is preferably initialized to minus one (−1) at start of video processing. At block 1012, the counter is checked to determine if the value is greater than four. If it is, the counter is reset to zero in block 1014 before proceeding to block 1016. However, if counter is not greater than four, as determined in block 1012, processing continues in block 1016 to determine the appropriate frame count. If the frame count is determined in block 1016 to be zero, two, or three, the second video signal is generated in block 1018 by combining the second temporary video signal and the third temporary signal video signal. However, if it is determined in block 1016 that frame count is one or four, then the second video signal is generated in block 1020 by combining the first temporary video signal and the second temporary signal video signal. The second video signal is the resulting signal after removing the mixed fields of the 3-2 pulldown video source.

A television signal (such as NTSC, PAL and SECAM) is composed of picture scans (or fields), each of which represents, at half the picture resolution, the odd (or top) lines of the picture and the even (or bottom) lines of the picture. Successive odd and even fields can be interleaved to generate progressive frame video. This process is necessary in situations such as displaying a television signal on a non-interlaced video monitor (e.g. computer monitor or high-definition television set).

Not all video materials originate from a film source, however. Some video materials may have been captured using an interlaced camera. When video frames are captured using an interlaced camera, there usually is a time lag between the instant when the camera frame capturing the odd lines (i.e. odd field) and the subsequent frame capturing the even lines (note that video shot using progressive camera will not have field motion). If the scene comprises fast moving objects, or the camera itself is in motion, the delay between odd and even fields causes a horizontal shift in object representation within the same frame. When the video signal is projected on an interlaced display device, the motion appears natural since the odd and even fields are displayed sequentially. However, when odd and even fields are interleaved to produce a single progressive frame, such as for display on a non-interlaced video monitor or for still pictures, the differences in object position between the two fields in each frame of the picture become apparent in a form of jagged lines, jitter or sawtooth effect.

Referring back to FIG. 3, at step 306, an algorithm for detecting pixel motion may be employed. This may include a method using the three consecutive field samples at "N", "N-1", and "N-2" generated in blocks 200 through 202. For example, a new video output may be computed for field "N" by averaging between the pixels in the adjacent lines at field "N-1". Another embodiment may involve a cubic spline fit of the three or other combination of field samples to obtain the desired video output.

At step 308, the pixel motion is removed before conversion of the video scanned signal into progressive video at step 310. The pixel motion may be removed if the difference in pixel intensity between field "N" and field "N-2" is larger than a predetermined threshold value. The comparison is done on a pixel-by-pixel basis and the selected pixel at field "N" is declared to have motion if the difference is greater than a predetermined threshold. One reason for using the field prior to the previous field (i.e. "N-2") is because of a desire to compare even fields with even fields and odd fields with odd fields. In one embodiment, when motion is detected at block 308, the value of the selected pixel at field "N" is replaced by the average value of the pixel at field "N-1" that is one line above the selected pixel and the pixel, also at field "N-1", that is one line below the selected pixel. As an illustration, assuming line 1 of field "N" is the current line being processed, and that the difference in value of a pixel in line 1 of field "N" and a corresponding pixel in line 1 of field "N-2" yields a value greater than a pre-determined threshold value, then pixel motion is declared. To correct for the pixel motion, the average of the corresponding pixel in line 0 and line 2 of field "N-1" is used to replace the pixel at line 1 of field "N". Using the average of the pixels in adjacent lines of the previous frame creates a smoothing effect on the video signal.

From steps 304, 308, and possibly from step 306, processing proceeds to step 310 where the odd and even frames are interleaved to produce the progressive (i.e. non-interlaced) video material. Referring back to FIG. 2, after processing is complete in block 204, the de-interlaced frame of video material is stored at block 206 in preparation for additional processing, as required. At step 208, an appropriate video scaler may be employed to scale the data to a desired output resolution. For example, the de-interlaced signal may be scaled up from an NTSC/PAL resolution to a desired output resolution and rate using weighted average method vertically and horizontally to maintain constant pixel rate.

At the conclusion of the scaling, the scaled progressive signal may be reconverted at Digital-to-analog converter block 210 for display on analog devices.

Determination of 3-2 Pulldown

Figure 4:
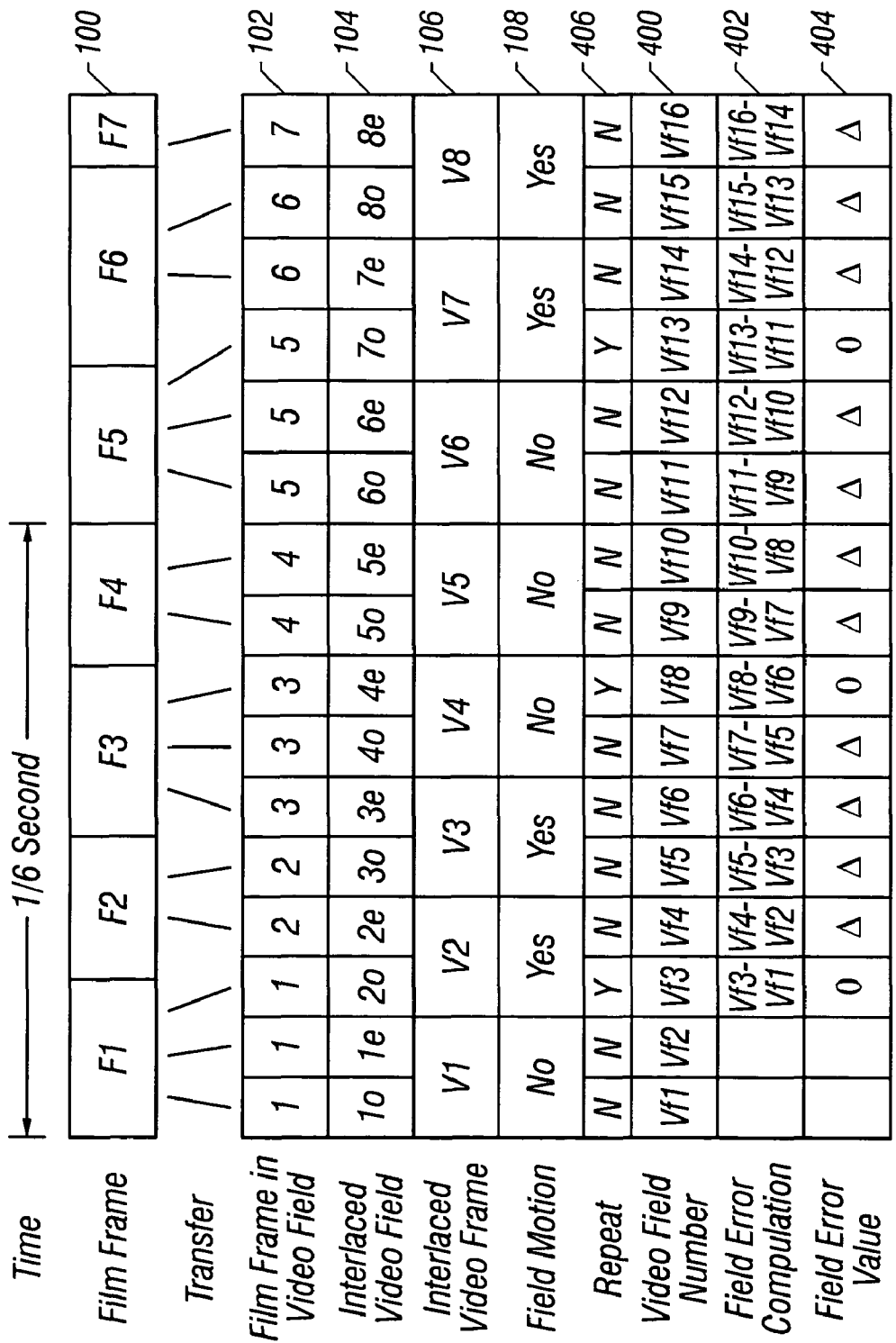
FIG. 4 is an illustration of the concept of using five consecutive fields to determine whether video material originated from film source according to an embodiment of the present invention.

FIG. 4 is an illustration of the concept of using five consecutive fields to determine whether video material originated from film source according to an embodiment of the present invention. The data in FIG. 4 contains rows 100 through 108 of FIG. 1 with four additional rows 400 through 406 added at the bottom to illustrate the mechanics of an embodiment of the present invention. The added rows are: "Video Field Number" (400) to identify the video fields to aid in the illustration that follows; "Field Error Computation" (402) to show which video fields are used in the computation of the field error; "Field Error Value" (404) to show the result from the computation where the material originated from film source; and "Repeat" (406) to indicate repeat fields (i.e. where entry "Y" indicates repeat field). A repeat field occurs wherever "Field Error Value" 404 is zero in this illustration. This, coincidentally, is where there is a local minimum between five consecutive frames assuming all the deltas are positive values, for example, when absolute values of field errors are used.

Figure 7:
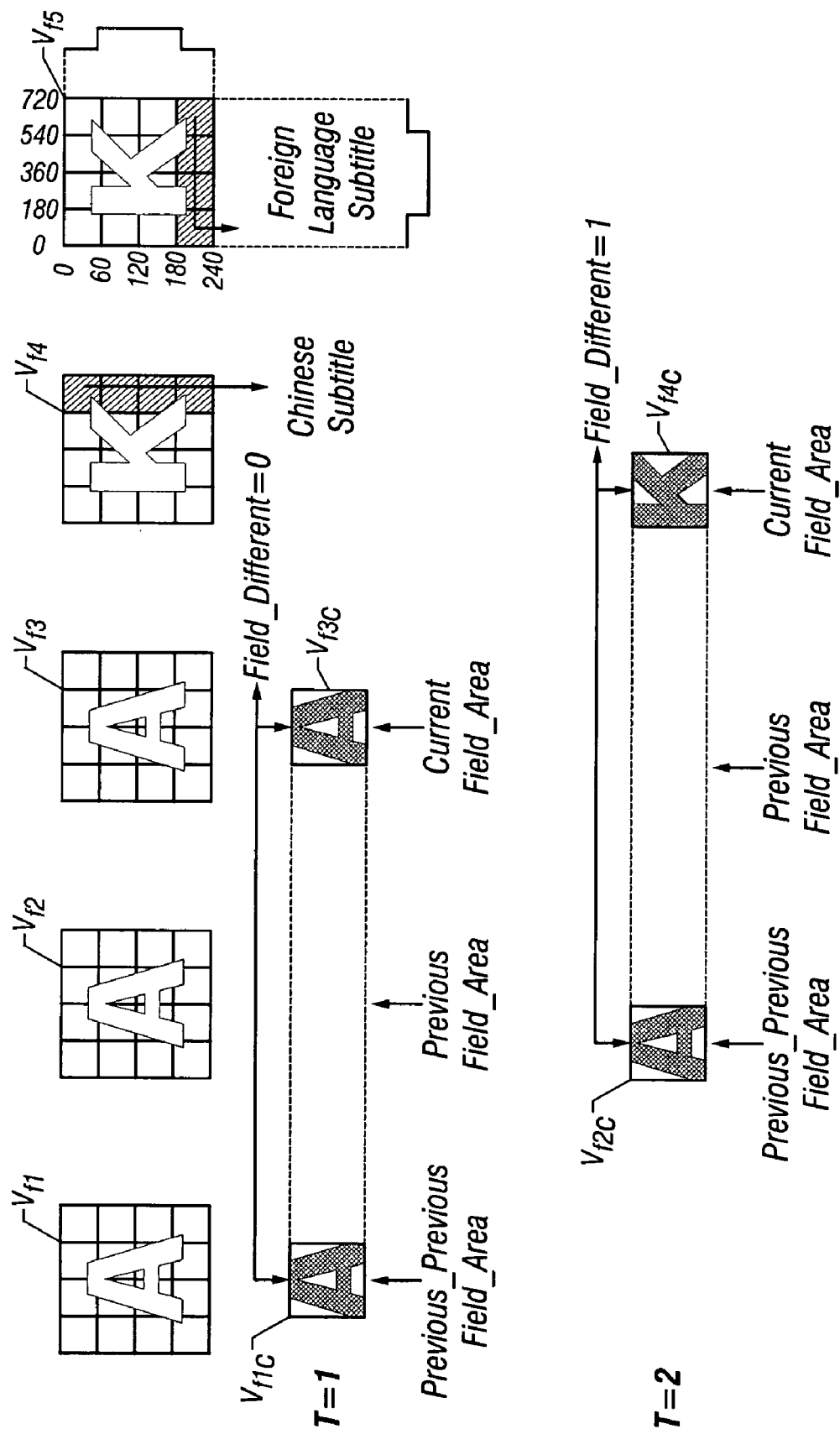
FIG. 7 is an illustration of the selection of the field area used for determination of field differences in accordance with an embodiment of the present invention.

Computation of the "Field Error" (402) involves some mathematical difference between the current field and the field prior to the previous field. For example, to compute the error in video field vf3 requires the comparison of the pixel intensities between video field vf3 and video field vf1, and error in video field vf4 requires the comparison of the pixel intensities between video field vf4 and video field vf2, and so on. One method to generate the mathematical difference may simply use absolute value of the sum of the differences in intensity of the pixels in a selected area, for example, as shown in FIG. 7. Another method may involve using the sum of the absolute value of the differences in intensity of the pixels in a selected area such as that shown in FIG. 7. Other embodiments may even be as complicated as using least square methods. The present invention contemplates the use of any mathematical scheme that can derive the differences between the current field and the field prior to the previous field.

The "Field Error Value" (404) row shows the resulting pixel field errors assuming perfect conditions and no computational or noise errors. As shown, column vf3 error shows a zero value. This is because video field vf3 and video field vf1 originated from the same film frame f1 (i.e. 1o and 1o) therefore the difference in pixel intensity should yield zero. Since the video material originated from film source, the pattern repeats itself every five fields. Thus, a repeat field (illustrated as a "Y" in row 406) occurs every five video fields if the interlaced video material originated from a 3-2 pulldown of film material. For example, the "Field Error Value" is zero in video field vf8 and video field vf13, and so on. This is all assuming that the area used in generating the differences is as shown in FIG. 7 with the subtitle areas excluded and that all conditions are perfect (i.e. excluding noise and other irregularities).

However, in actual implementation the error may not be perfectly zero due to irregularities such as signal noise, errors in the analog-to-digital conversion process, deterioration in the video material, and numerous other potential sources of corruption. In one or more embodiments, the error is compared to a predetermined zero threshold value. The selected zero threshold value should be adequate to reliably preclude noise while detecting the repeat fields caused by 3-2 pulldown. The Analog-to-digital conversion resolution should also be accounted for when selecting the zero threshold value. For example, a pixel intensity difference of ten (10) or less may be acceptable as the zero threshold value.

In another embodiment, the local minimum in five consecutive fields is identified as the repeat field and a confirmation is made that the local minimum repeats every five fields thereafter. Using the local minimum eliminates the trial and error that may be necessary to determine a suitable zero threshold value for repeat field detection in the presence of noise and other uncertainties. Local minimum is especially more attractive because it is reasonable to assume that noise and other uncertainties would be evenly distributed throughout the video material. Therefore, film mode is maintained so long as the local minimum occurs every five fields thereafter.

Video Conversion

Figure 5A:
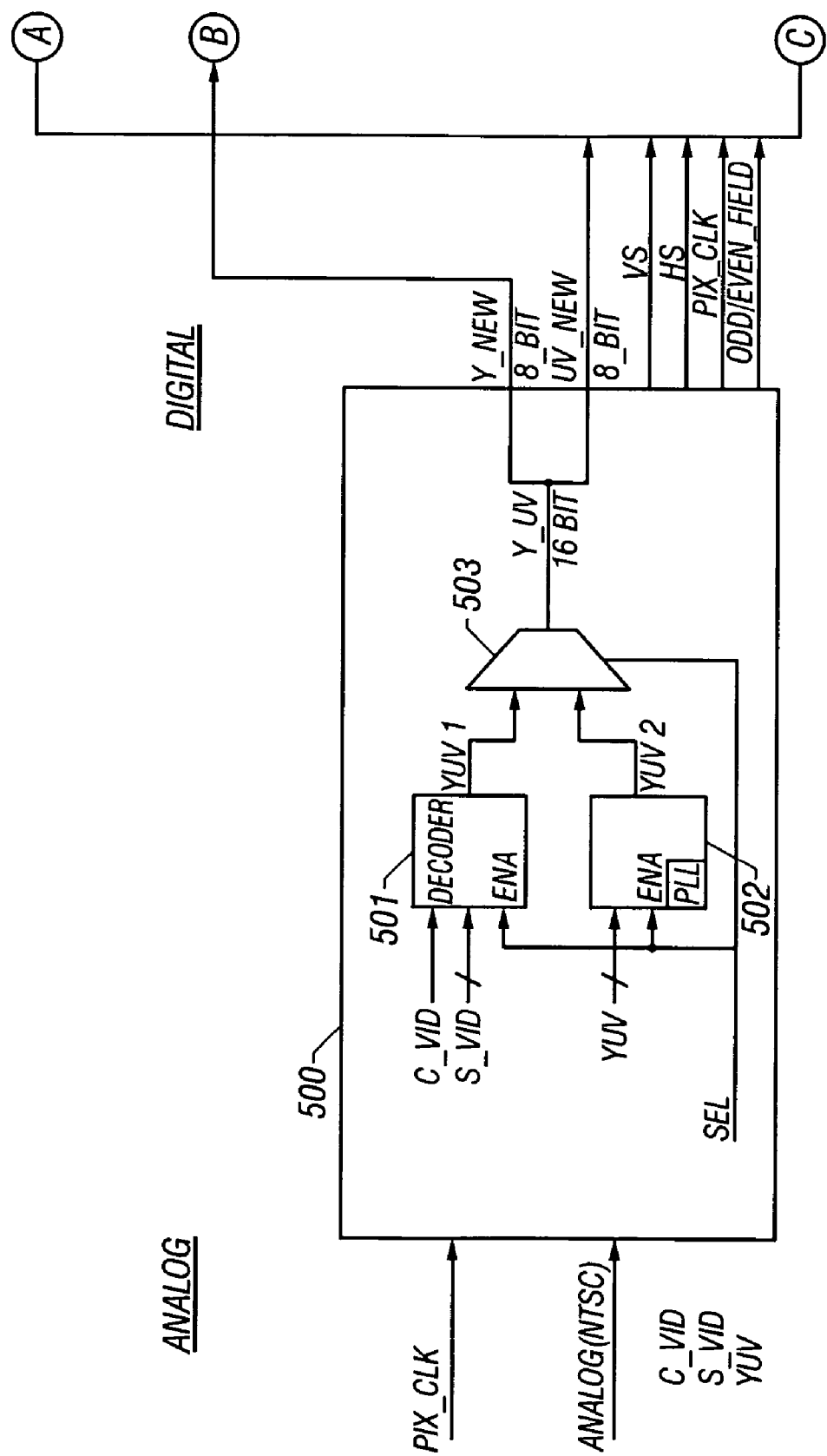
FIG. 5 is a block diagram illustrating the apparatus of the video conversion process according to an embodiment of the present invention.
Figure 5B:
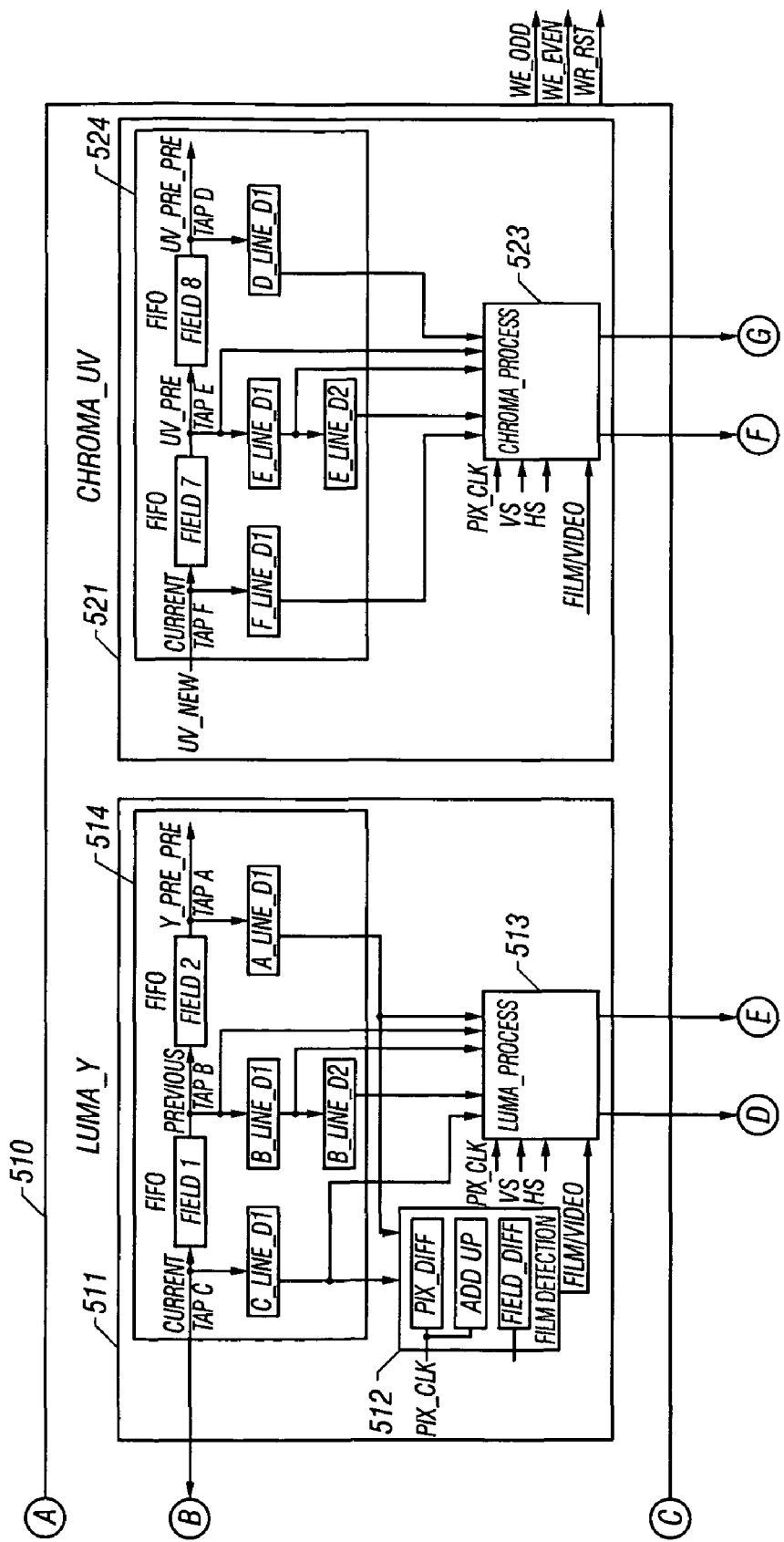
Figure 5C:
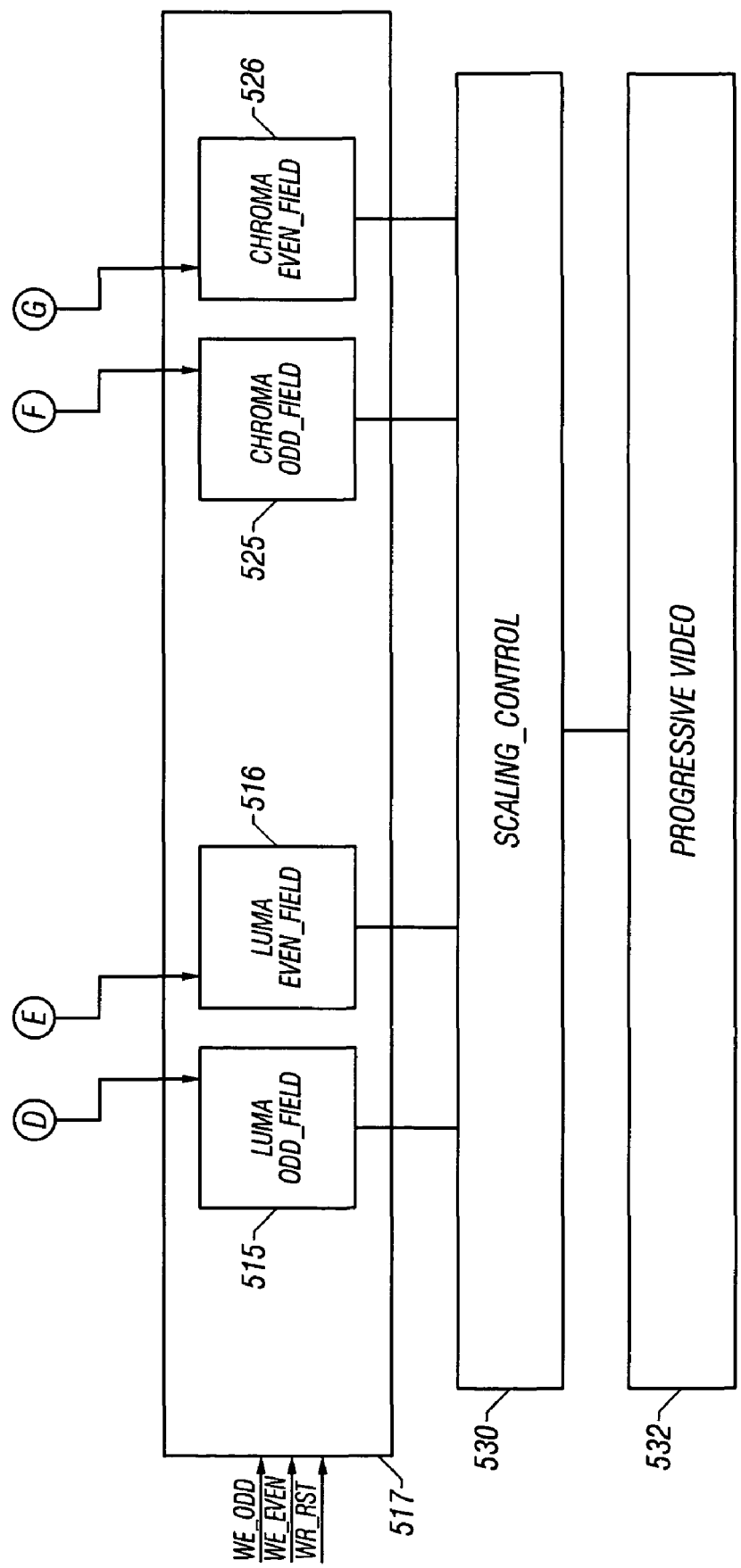

FIG. 5 is a block diagram illustrating the apparatus of the video conversion process according to an embodiment of the present invention. Block 500 is a digitizer block having the pixel clock (PIX_CLK) as input and an analog video input. The analog video input may be of any of the color model formats such as C-Video, S-Video, or YUV, for example. The digitizer block may include an analog-to-digital (A/D) converter block 502 and a decoder block 501 for decoding the components and bit depths of a C-Video or S-Video color model, for example. The A/D converter block converts analog signals to digital representations. For example, the A/D converter is used to convert the YUV color model input to digital components. In one embodiment, the output (Y_UV) of selector block 503 comprises 16-bits of data for each pixel wherein the first 8-bits represent the luminance (or luma) and the remaining 8-bits represent the chrominance (or chroma). The luminance (also known as pixel intensity) and chrominance data are represented as Y_NEW and UV_NEW, respectively, in output of block 500.

In block 510, the luminance Y_NEW and chrominance UV_NEW are processed to generate the corrected odd and even fields for each frame of the video data that are subsequently stored in memory block 517. Data in block 517 is available at the vertical sync pulse of the incoming video signal (i.e. 60 Hertz for an NTSC video) therefore writing into memory blocks 515, 516, 525, 526 occur in the same cycle such that during generation of the progressive video image, consistent data (i.e. data from common film frame) is used. Thus, during generation of the non-interlaced or progressive video material, luminance and chrominance data may be read from memory block 517 at a desired clock rate.

In one embodiment, inputs to block 510 are outputs of the digitizer block 500 and include the 8-bit luminance Y_NEW, the 8-bit chrominance UV_NEW, the vertical sync pulse VS, the horizontal sync pulse HS, the pixel clock PIX_CLK, and an Odd/Even field signal ODD/EVEN_FIELD. The Odd/Even field signal may be used to signify that, when true, the odd field of the interlaced video material is available at the outputs Y_NEW and UV_NEW, for example.

In block 530, the processed luminance and chrominance data from memory block 517 are scaled using any desired video scaling process before being converted to the proper progressive video output format in block 532.

Luminance Processing

The video luminance data is processed in block 511, which comprises raw data memory block 514, film mode generating block 512, and data selector block 513. Memory block 514 further contains storage for luminance data from the previous field, FIELD 1 (equivalent to field N-1 of FIG. 2), and storage for luminance data from the field prior to the previous field, FIELD 2 (equivalent to field N-2 of FIG. 2). For example, at the start of the $1/60^{th}$ second interval of an NTSC vertical cycle, data from storage FIELD 1 which is available at TAP B is pushed into FIELD 2 to make it available at TAP A, and data originally at TAP C is pushed into FIELD 1 to make it available at TAP B. Meanwhile, the new field data Y_NEW from digitizer block 500 is available at TAP C. Thus, TAP A, TAP B, and TAP C contain data from three consecutive fields of video luminance data (e.g. field N, field N-1, field N-2).

In one embodiment, data processing is performed one horizontal line at a time. Since one complete line of data is available between two horizontal sync (HS) pulses, one line of video luminance data is stored in an intermediate buffer for processing at occurrence of each horizontal sync pulse. For example, assuming that the current horizontal sync pulse is "M" (corresponding to line "M"), the previous horizontal sync pulse is "M-1" (corresponding to line "M-1") and the horizontal sync pulse prior to "M-1" is "M-2" (corresponding to line "M-2"), then line buffer A_LINE_D1 contains data for one complete line of pixels from TAP A (i.e. field N-2) at horizontal sync pulse "M-1", line buffer B_LINE_D1 contains data for one complete line of pixels from TAP B (i.e. field N-1) at horizontal sync pulse "M-1", and line buffer C_LINE_D1 contains data for one complete line of pixels from TAP C (i.e. field N) at horizontal sync pulse "M-1". Data from line buffer B_LINE_D1 is buffered into line buffer B_LINE_D2 before being overwritten with new data. Thus, B_LINE_D2 contains data for the line at horizontal sync pulse "M-2". Thus, assuming line 1 is the current line out of digitizer block 500, then A_LINE_D1 contains data for line 2 of field "N-2", B_LINE_D1 contains data for line 2 of field "N-1", B_LINE_D2 contains data for line 3 of field "N-1", and C_LINE_D1 contains data for line 2 of field "N". The five inputs are required for video luminance processing in data selector block 513. New line data is available at the line buffers at the occurrence of every horizontal sync pulse HS. The line being processed in block 510 is the line at horizontal sync pulse "M-1".

Data from buffer A_LINE_D1 and buffer C_LINE_D1 are passed as inputs to the film mode-generating block 512. Buffer data C_LINE_D1 represents data from the current field being processed, and data in buffer A_LINE_D1 represents data from the field prior to the previous field. The field error is computed using data from C_LINE_D1 and A_LINE_D1 by calculating the sum of the absolute value of the difference in intensity (i.e. luminance) of the pixels in buffers A_LINE_D1 and C_LINE_D1 in the range discussed in FIG. 7 for all the lines in the video fields being compared. Other embodiments of the present invention may employ different mathematical methods for calculating the field error using data available in buffers C_LINE_D1 and A_LINE_D1.

Since data from one complete video field occurs between two vertical sync (VS) pulses, VS is passed as input to the film mode-generating block 512 to signal start of processing for a new field. In one embodiment, the block PIX_DIFF in film mode generating block 512 generates the pixel difference at the occurrence of every pixel clock PIX_CLK and the accumulator ADD UP accumulates the pixel errors. At the occurrence of the vertical sync pulse VS, the field error in accumulator ADD UP is pushed into a different memory location (shown in FIG. 6 as ACC 1) and the accumulator ADD UP is cleared and made available for accumulating the pixel error for the next field to be processed.

Figure 6A:
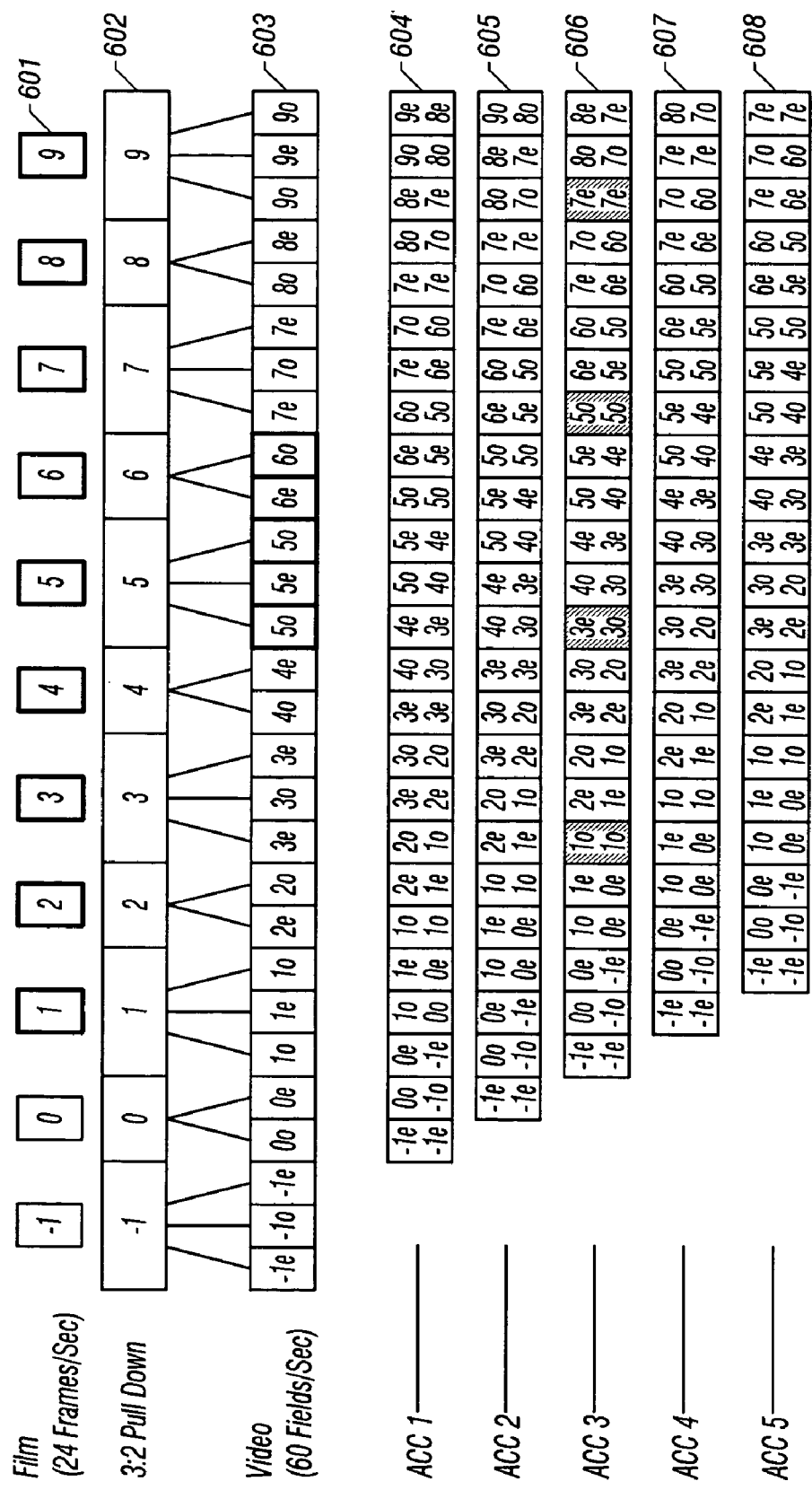
FIG. 6 is an illustration of the processing that occurs during the film mode flag generation and operation in the film mode according to an embodiment of the present invention.
Figure 6B:
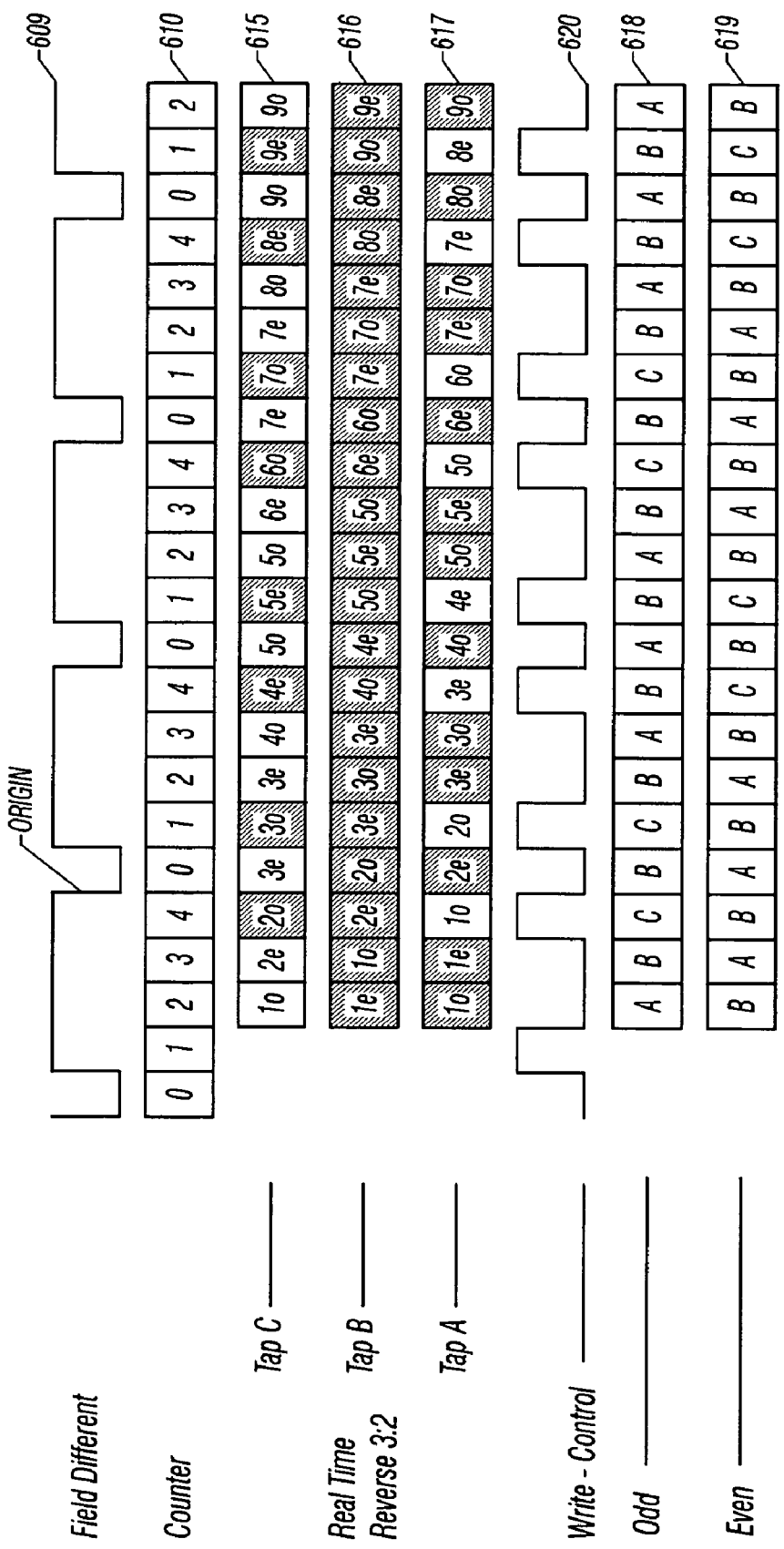

FIG. 6 is an illustration of the processing that occurs during film mode flag generation and operation in the film mode according to an embodiment of the present invention. The data shown in FIG. 6 is used to illustrate the processes of FIG. 5. In FIG. 6, the row 601 labeled FILM shows the film frames converted to interlaced video according to a 3-2 pulldown process. The row 603 labeled VIDEO shows the video fields and the corresponding film frame used in their generation using a 3-2 pulldown process. For example, video field 1e represents film frame 1 in an even video field, and video field 1o represents film frame 1 in an odd video field.

Rows ACC 1 to ACC 5 are accumulators used to temporarily store field errors for five consecutive fields. The characters in the blocks represent the video identities used in generation of the field error. In a perfect world, the field error is "zero" when the field contents are identical within the same block, thus indicating a repeat field. However, because of noise, degradation in the video material, and other irregularities, field error would most likely not be zero in actual implementation. Thus, "zero" is used in this specification for purposes of illustration only.

Accumulator ACC 2 contains the same data as ACC 1 shifted by one field (i.e. delayed by one sample frame), ACC3 contains data in ACC2 shifted by one field, and so on through ACC 5. This is because the data in the accumulators are shifted right in the sequence ACC15=>ACC2=>ACC3=>ACC4=>ACC5. Data in these five accumulators are used to generate the film mode flag. In one embodiment, a repeat field is declared when the field error in ACC 3 is "zero" (i.e. less than a predetermined zero threshold value). Another embodiment uses the local minimum (i.e. the smallest) of the five accumulator values to determine a repeat field. In either case, film mode is declared after detection and adequate confirmation that the repeat field reoccurs after five consecutive fields. Assertion (i.e. low indication) of the FIELD-DIFFERENT flag 609 indicates detection of a repeat field and causes a reset of the video field COUNTER 610 to zero. In cases where the video data truly originated from film source, the FIELD-DIFFERENT flag 609 is asserted every five fields, thus, flag COUNTER 610 is reset to 0 after the count of 4 (i.e. COUNTER counts from 0 to 4). Assertion of film mode may require confirmation over certain number of assertions of the FIELD-DIFFERENT 609 flag. For example, film mode may be confirmed over 2 cycles of COUNTER 610 before it is asserted. Assertion of film mode triggers correction of the video data in selection block 513 of FIG. 5.

In one embodiment, assertion of repeat field (i.e. COUNTER 610 equals zero) occurs when the data used in computing field error contained in ACC 3 (606) originated from the same film frame. For example, starting with the column corresponding to where ACC 3 (606) contains both 1*o* and 1*o*, COUNTER 610 has an assertion of "0" because, the two interlaced video fields (i.e. field N and field N-2) used in computation of the field error originated from film frame 1, therefore, the field error theoretically computes to "zero" (i.e. 1*o*-1*o*=zero). Note that the video field (603) being processed during that cycle is an even field containing film frame 3 (i.e. the first occurrence of 3*e* in row 603). In this specification, a field error of "zero" contemplates conditions in a perfect world and is used for purposes of illustration only. However, as used in the rest of the specification, "zero" refers to a value less than a predetermined threshold value or a local minimum of the five accumulator values. Using the local minimum precludes the need for specifying a desired minimum threshold value.

In one embodiment, COUNTER 610 resets whenever the field error in ACC 3 (606) is "zero" and since the field error is "zero" every five cycles (e.g. the next field error is 3*e*-3*e* which is five fields later), COUNTER 610 counts from 0 to 4 and then restarts at 0. For purposes of illustration, the field when COUNTER 610 is 1 is referred to as the first field, the field when COUNTER 610 is 2 is referred to as the second field, the field when COUNTER 610 is 3 is referred to as the third field, the field when COUNTER 610 is 4 is referred to as the fourth field. The FIELD-DIFFERENT flag 609 is also asserted whenever COUNTER 610 is 0 and for this example, the FIELD-DIFFERENT assertion in the column labeled as "origin" in row 609 is the starting point for the discussion that follows. In the following discussion, although data availability is stated in terms of which TAP the data arrives from, it should be noted that the pixel data is actually processed from data available in line buffers A_LINE_D1, B_LINE_D1, and C_LINE_D1.

Assuming that data to be written into memory blocks 515 and 516 are available from TAP A (617), TAP B (616), and TAP C (615). The desire is that LUMA ODD_FIELD memory block 515 and LUMA EVEN_FIELD memory block 516 contain data from the same film frame, if in film mode, or from the same video frame, if in video mode, at the instant data is read for processing in block 530, for example, during video scaling. Starting from the column "origin" (i.e. COUNTER=0), the data available in TAPs A, B, and C are as follows: TAP A (617) contains data representing film frame 2 in the interlaced video even field (i.e. 2*e*); TAP B (616) contains data representing film frame 2 in the interlaced video odd field (i.e. 2*o*); and TAP C (615) contains data representing film frame 3 in the interlaced video even field (i.e. 3*e*). Therefore, the desire is to have data from TAP B in LUMA ODD_FIELD memory block 515 and data from TAP A in LUMA EVEN_FIELD memory block 516 in order to have data from a common film frame in the progressive video frame.

Examining data in TAP A, TAP B, and TAP C in the first field after "origin" (i.e. COUNTER 610 is 1), TAP B and TAP C contain data from the same film frame 3 while TAP A contains data from film frame 2 therefore, data from TAP C is written into LUMA ODD_FIELD memory block 515 and data from TAP B is written into LUMA EVEN_FIELD memory block 516. Proceeding along to the second and third fields, data in TAP A and TAP B are written into memory block 517 because these taps contain material from the same film frame. However, in the fourth field, TAP B and TAP C contain data from the same film frame (4*o* and 4*e*) while TAP A contains data from film frame 3, therefore data in TAP B and TAP C are written into output memory block 517. This pattern repeats itself such that TAP A and B are written into memory in every field except the first and fourth fields where TAP B and TAP C are written instead. Thus the WRITE-CONTROL flag 610 is asserted at COUNTER 610 values of 1 and 4 indicating when to read from TAP B and TAP C instead of from TAP A and TAP B.

Selection block 513 controls which TAP data is written into LUMA ODD_FIELD memory block 515 and LUMA EVEN_FIELD memory block 516. The luminance data is selected from the input pixel data available in TAP A, TAP B, and TAP C. The pixel clock PIX_CLK, the horizontal sync pulse HS, and the vertical sync pulse VS controls writing of the individual pixels for each field.

As discussed above, during film mode, the write control flag WRITE-CONTROL (620) asserts at COUNTER (610) values of 1 and 4. The data selector 513 writes data from TAP B and TAP A into output memory 515 and 516 when write control flag WRITE-CONTROL (620) is false and from TAP B and TAP C when true. In other words, field data from TAP B is always written in output memory while TAP A is written when write control flag is false and TAP C is written when write control flag is true. Selectively writing the data in this manner results in correction of the video data such that only data from the same film frame is included in one non-interlaced video frame.

The highlighted columns in rows 615 through 617 indicate the video field data being written into output memory block 517. Rows 618 and 619 show the taps (i.e. A, B, or C) being selected for the odd and even fields of the video frame. Data in row 618 is written to LUMA ODD_FIELD block 515 and data in row 619 is written to LUMA EVEN_FIELD block 516.

When current field is odd, data from TAP C is written into output memory block 515 and data from TAP B is written into output memory block 516. When the current field is even, data from TAP C is written into output memory block 516 and data from TAP B is written into output memory block 515. In one embodiment, when processing is in video mode and there is no pixel motion detected, data from TAP C and TAP B are written to memory block 517. Other embodiments may use any combination of the TAPs A, B, and C.

When data processing is in the video mode instead of film mode, pixel motion may be detected by comparing equivalent pixel intensities from C_LINE_D1 and A_LINE_D1. For example, luminance data in line buffer C_LINE_D1 may be compared with the line data from buffer A_LINE_D1 to determine if the difference is greater than a predetermined threshold whereby pixel motion is declared. After declaration of pixel motion, luminance data written into memory block 517 may be computed using any suitable method to smooth the luminance data involving any combination of the three data sources such as averaging, for example. The same method applied to smooth the luminance data to generate the output is applied to the chrominance data as well. In one embodiment, the current intensity value for the pixel being processed (at line "M-1") is replaced with the average of the corresponding pixel in the TAP B input (representing line "M") and the corresponding pixel at B_LINE_D2 (representing line "M-2").

Chrominance Processing

The chrominance data is processed in block 521, which comprises raw data memory block 524, and data selector block 523. Memory block 524 further contains storage for chrominance data from the previous field, FIELD 7 (equivalent to field N-1 of FIG. 2), and storage for chrominance data from the field prior to the previous field, FIELD 8 (equivalent to field N-2 of FIG. 2). For example, at the start of the $\frac{1}{60}^{th}$ second interval of an NTSC vertical cycle, data from storage FIELD 7 that is available at TAP E is pushed into FIELD 8 to make it available at TAP D, and data originally at TAP F is pushed into FIELD 7 to make it available at TAP E. Meanwhile, the new field data UV_NEW from digitizer block 500 is available at TAP F. Thus, TAP D, TAP E, and TAP F contain data from three consecutive fields of video chrominance data (e.g. field N, field N-1, field N-2).

In one embodiment, data processing is performed one horizontal line at a time. Since one complete line of data is available between two horizontal sync (HS) pulses, one line of video chrominance data is stored in an intermediate buffer for processing at occurrence of each horizontal sync pulse. For example, line buffer D_LINE_D1 contains data for one complete line of pixels from TAP D (i.e. field N-2) at horizontal sync pulse "M-1", line buffer E_LINE_D1 contains data for one complete line of pixels from TAP E (i.e. field N-1) at horizontal sync pulse "M-1", and line buffer F_LINE_D1 contains data for one complete line of pixels from TAP F (i.e. field N) at horizontal sync pulse "M-1". Data from buffer E_LINE_D1 is buffered into line buffer E_LINE_D2 before being overwritten with new data. Thus, E_LINE_D2 contains data for the line at horizontal sync pulse "M-2". Thus, assuming line 1 is the current line out of digitizer block 500, then D_LINE_D1 contains data for line 2 of field "N-2", E_LINE_D1 contains data for line 2 of field "N-1", B_LINE_D2 contains data for line 3 of field "N-1", and F_LINE_D1 contains data for line 2 of field "N". The five inputs are required for video chrominance processing in data selector block 523. New line data is available at the line buffers at the occurrence of every horizontal sync pulse HS. The line being processed in block 510 is the line at horizontal sync pulse "M-1".

The film mode flag is generated using the luminance data as discussed above and the WRITE-CONTROL flag 620 controls writing of chrominance data into memory blocks 525 and 526. Using FIG. 6 as illustration but renaming TAP A, TAP B, and TAP C, to TAP D, TAP E, and TAP F, respectively. Assuming that data to be written into memory blocks 525 and 526 are available from TAP D (equivalent to 617), TAP E (equivalent to 616), and TAP F (equivalent to 615). The desire is that CHROMA ODD_FIELD memory block 525 and CHROMA EVEN_FIELD memory block 526 contain data from the same film frame if in film mode, or from the same video frame if in video mode at the instant data is read for processing in block 530, for example, during video scaling. Starting from the column "origin" (i.e. COUNTER=0), the data available in TAPs D, E, and F are as follows: TAP D contains chrominance data representing film frame 2 in the interlaced video even field (i.e. 2e); TAP E contains chrominance data representing film frame 2 in the interlaced video odd field (i.e. 2o); and TAP F contains chrominance data representing film frame 3 in the interlaced video even field (i.e. 3e). Therefore, the desire is to have data from TAP E in CHROMA ODD_FIELD memory block 525 and data from TAP D in CHROMA EVEN_FIELD memory block 526 in order to have data from a common film frame in the progressive video frame.

Examining data in TAP D, TAP E, and TAP F in the first field after "origin" (i.e. COUNTER 610 is 1), TAP E and TAP F contain data from the same film frame 3 while TAP D contains data from film frame 2 therefore, data from TAP F is written into CHROMA ODD_FIELD memory block 525 and data from TAP E is written into CHROMA EVEN_FIELD memory block 526. Proceeding along to the second and third fields, data in TAP D and TAP E are written into memory block 517 because these taps contain material from the same film frame. However, in the fourth field, TAP E and TAP F contain data from the same film frame (4o and 4e) while TAP D contains data from film frame 3, therefore data in TAP E and TAP F are written into output memory block 517. This pattern repeats itself such that TAP D and E are written into memory in every field except the first and fourth fields where TAP E and TAP F are written instead. Thus the WRITE-CONTROL flag 610 is asserted at COUNTER 610 values of 1 and 4 indicating when to read from TAP E and TAP F instead of from TAP D and TAP E.

Selection block 523 controls which TAP data is written into CHROMA ODD_FIELD memory block 525 and CHROMA EVEN_FIELD memory block 526. The chrominance data is selected from the input pixel data available in TAP D, TAP E, and TAP F. The pixel clock PIX_CLK, the horizontal sync pulse HS, and the vertical sync pulse VS control writing of the individual pixels for each field.

As discussed above, during film mode, the write control flag WRITE-CONTROL asserts at COUNTER values of 1 and 4. The data selector 523 writes data from TAP E and TAP D into memory 525 and 526 when write control flag WRITE-CONTROL is false and from TAP E and TAP F when true. In other words, field data from TAP E is always written in memory while TAP D is written when write control flag is false and TAP F is written when write control flag is true. Selectively writing the data as discussed above results in correction of the video chrominance data such that only data from the same film frame is included in one non-interlaced video frame.

The highlighted columns in rows 615 through 617 indicate the fields being written into memory block 517. Rows 618 and 619 show the taps (i.e. corresponding to TAPs D, E, or F of FIG. 5) being selected for the odd and even fields of the video frame. Data in row 618 is written in to CHROMA ODD_FIELD block 525 and data in row 619 is written in CHROMA EVEN_FIELD block 526.

When current field is odd, data from TAP F is written into output memory block 525 and data from TAP E is written into output memory block 526. When the current field is even, data from TAP F is written into output memory block 526 and data from TAP E is written into output memory block 525. In one embodiment, when processing is in video mode and there is no pixel motion detected, data from TAP F and TAP E are written to memory block 517. Other embodiments may use any combination of the TAPs D, E, and F.

Pixel Area for Computation of Field Error

FIG. 7 is an illustration of the selection of the field area used for determination of field differences in accordance with an embodiment of the present invention. As shown in blocks vf1-vf5, the horizontal and vertical resolutions of the input frame are divided into four regions each. The first and last regions in the horizontal plane are discarded. Discarding the last region in the horizontal plane eliminates the possibilities of including Chinese subtitles in the pixel comparisons which may distort the results. Also, the top and bottom regions in the vertical plane are discarded from consideration to preclude the inclusion of foreign language subtitles in the pixel comparisons. The resulting pixel region used for calculating the mathematical difference between the fields is shown in blocks vf1c-vf4c and is represented as 180-540 horizontal.

Comparing the pixel intensities between subfields vf3c and vf1c (i.e. where "N" is vf3c and "N-2" is vf1c) yields a substantially zero value since the two subfields are identical. In this case, the flag "Field_Different" would be set to "0" since subfield vf3c is mathematically equal to subfield vf1c. However, comparing subfield vf4c and subfield vf2c (i.e. where "N" is vf4c and "N-2" is vf2c) yields a non-zero value since this is tantamount to comparing "K" with "A". Hence, the "Field_Different" flag would be set to "1" in acknowledgement that subfield vf4c is different from subfield vf2c.

Figure 8:
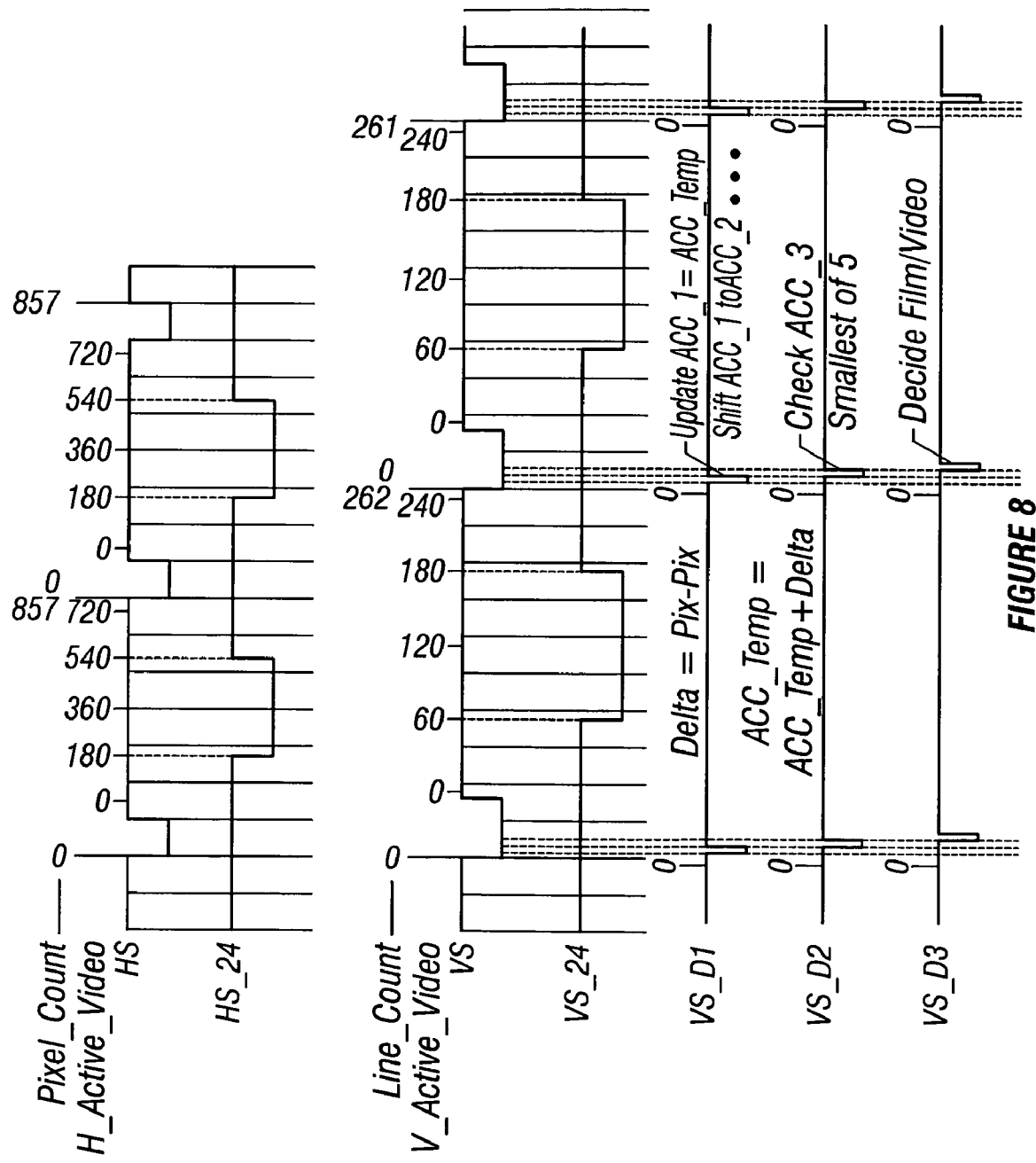
FIG. 8 is a timing diagram showing the computation of the field error in accordance with an embodiment of the present invention.

FIG. 8 is a timing diagram showing the computation of the field error in accordance with an embodiment of the present invention. Each horizontal line of an NTSC video comprises 858 pixels of display therefore the horizontal sync pulse (HS) occurs after every 858 counts of the pixel clock. The vertical sync pulse (VS) of NTSC video occurs after every 262.5 lines, approximately because the odd fields of the interlaced video are displayed on the odd horizontal lines followed by the even fields on the even horizontal lines.

The lines represented by HS_24 and VS_24 are the sync signals for computation of the mathematical difference between the fields of interest, such as the current field and the field prior to the previous field in the previous examples. Pixel differences are computed when HS_24 and VS_24 are asserted. The signals HS_24 and VS_24 will assert when the pixel count is within the comparison region (such as regions vf1c-vf4c) discussed in reference to FIG. 7 above. The full pixel difference is accumulated in a temporary register ACC_TEMP register before the occurrence of the next vertical sync pulse. Each vertical sync pulse occurs at the completion of every page (i.e. field) of display.

Five accumulators, for example ACC_1 to ACC_5, are used to store the field error for the five consecutive fields of interest discussed above in conjunction with detection of 3-2 pulldown. At the beginning of every vertical sync pulse, the data in the accumulators are shifted such that data previously in ACC_4 is moved to ACC_5, data in ACC_3 is moved to ACC_4, data in ACC_2 is moved to ACC_3, data in ACC_1 is moved into ACC_2. Finally, the data in the temporary register ACC_TEMP is stored into ACC_1. In this fashion, the accumulators always contain error data from the five previous fields. Another way to view the process is that the field error data contained in ACC_TEMP is being shifted into a stack that is five registers deep.

In one embodiment, when ACC_3 contains the minimum field error value of the five accumulators after five consecutive field errors have been generated, the field being processed is said to contain the repeat field. ACC_3 is examined after every field to determine if its field error remains the minimum of the five accumulators. If the source material is converted from film to video using 3-2 pull-down process, the condition that ACC_3 being the minimum of the five accumulators would then occur every five fields. As discussed earlier, a local minimum value in ACC_3 represents a repeat field analogous to the result of a 3-2 pulldown process. The repeat field must occur every five fields thereafter to maintain the video correction of the present invention. Other embodiments may use any of the other accumulators for determination of the repeat field; however, it is preferable to have two accumulators on each side of the minimum value.

Embodiment of Computer Execution Environment (Hardware)

Figure 9:
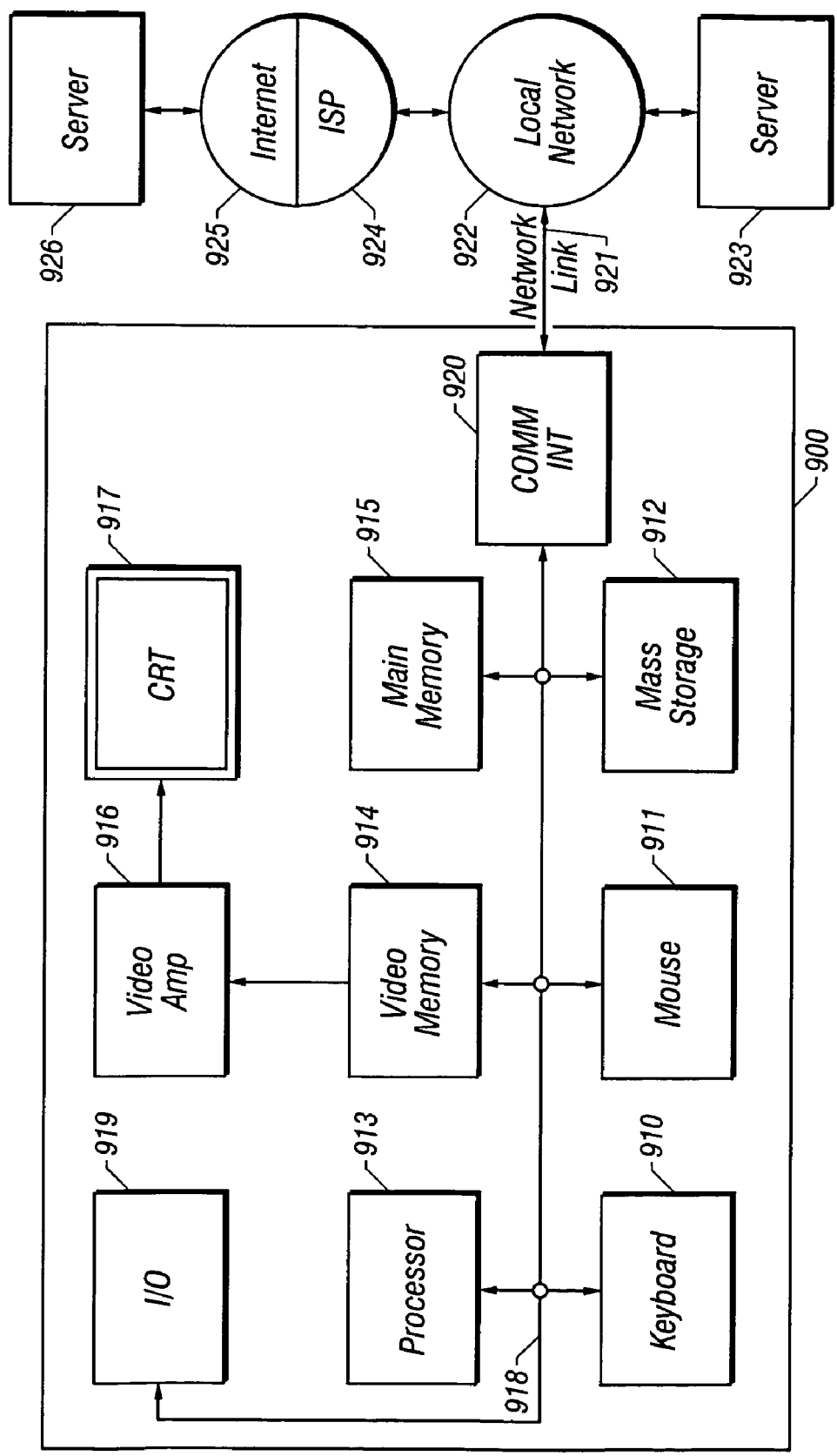
FIG. 9 is a block diagram of one embodiment of a computer system capable of providing a suitable execution environment for an embodiment of the invention.

An embodiment of the invention can be implemented as computer software in the form of computer readable code executed on any computer processing platform, or in the form of software (e.g., bytecode class files) that is executable within a runtime environment running on such a processing platform. An example of a general computer system is illustrated in FIG. 9. The computer system described below is for purposes of example only.

In FIG. 9, keyboard 910 and mouse 911 are coupled to a system bus 918. The keyboard and mouse are for introducing user input to the computer system and communicating that user input to processor 913. Other suitable input devices may be used in addition to, or in place of, the mouse 911 and keyboard 910. For example, computer 900 may be a set top box without a mouse or even keyboard. I/O (input/output) unit 919 coupled to system bus 918 represents such I/O elements as a printer, A/V (audio/video) I/O, etc.

Computer 900 includes a video memory 914, main memory 915 and mass storage 912, all coupled to system bus 918 along with keyboard 910, mouse 911 and processor 913. The mass storage 912 may include both fixed and removable media, such as magnetic, optical or magnetic optical storage systems or any other available mass storage technology. Bus 918 may contain, for example, address lines for addressing video memory 914 or main memory 915. The system bus 918 also includes, for example, a data bus for transferring data between and among the components, such as processor 913, main memory 915, video memory 914 and mass storage 912. Alternatively, multiplexed data/address lines may be used instead of separate data and address lines.

In one embodiment of the invention, the processor 913 is a SPARC™ microprocessor from Sun Microsystems, Inc. or a microprocessor manufactured by Intel, such as the 80×86, or Pentium processor, or a microprocessor manufactured by Motorola, such as the 680×0 processor. However, any other suitable microprocessor or microcomputer may be utilized. Main memory 915 is comprised of dynamic random access memory (DRAM). Video memory 914 is a dual-ported video random access memory. One port of the video memory 914 is coupled to video amplifier 916. The video amplifier 916 is used to drive the cathode ray tube (CRT) raster monitor 917. Video amplifier 916 is well known in the art and may be implemented by any suitable apparatus. This circuitry converts pixel data stored in video memory 914 to a raster signal suitable for use by monitor 917. Monitor 917 is a type of monitor suitable for displaying graphic images. Alternatively, the video memory could be used to drive a flat panel or liquid crystal display (LCD), or any other suitable data presentation device.

Computer 900 may also include a communication interface 920 coupled to bus 918. Communication interface 920 provides a two-way data communication coupling via a network link 921 to a local network 922. For example, if communication interface 920 is an integrated services digital network (ISDN) card or a modem, communication interface 920 provides a data communication connection to the corresponding type of telephone line, which comprises part of network link 921. If communication interface 920 is a local area network (LAN) card, communication interface 920 provides a data communication connection via network link 921 to a compatible LAN. Communication interface 920 could also be a cable modem or wireless interface. In any such implementation, communication interface 920 sends and receives electrical, electromagnetic or optical signals which carry digital data streams representing various types of information.

Network link 921 typically provides data communication through one or more networks to other data devices. For example, network link 921 may provide a connection through local network 922 to local server computer 923 or to data equipment operated by an Internet Service Provider (ISP) 924. ISP 924 in turn provides data communication services through the world wide packet data communication network now commonly referred to as the "Internet" 925. Local network 922 and Internet 925 both use electrical, electromagnetic or optical signals which carry digital data streams. The signals through the various networks and the signals on network link 921 and through communication interface 920, which carry the digital data to and from computer 900, are exemplary forms of carrier waves transporting the information.

Computer 900 can send messages and receive data, including program code, through the network(s), network link 921, and communication interface 920. In the Internet example, remote server computer 926 might transmit a requested code for an application program through Internet 925, ISP 924, local network 922 and communication interface 920.

The received code may be executed by processor 913 as it is received, and/or stored in mass storage 912, or other non-volatile storage for later execution. In this manner, computer 900 may obtain application code in the form of a carrier wave. Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

Thus, a method and apparatus for detecting and correcting motion artifacts in interlaced video signal converted for progressive video display have been described in conjunction with one or more specific embodiments. The invention is defined by the claims and their full scope of equivalents.

The invention claimed is:

1. A method for converting interlaced video material to non-interlaced video material using apparatus comprising an analog to digital converter, memory, and a processor comprising:

receiving interlaced video material comprising a sequence of video fields, each video field comprising an odd field or an even field of a video frame;

digitizing a plurality of said video fields of said sequence of video fields using said analog to digital converter to obtain pixel values for said video fields;

storing said pixel values in said memory;

for each of a plurality of sequential video fields of said sequence of video fields, comparing pixel values of a subfield of said sequential video field to pixel values of a corresponding subfield of a video field preceding a video field preceding said sequential video field using said processor to obtain a current field error value for said sequential video field;

shifting a plurality of stored field error values in a set of accumulators in said memory for temporarily holding field error values to allow said current field error value to be temporarily stored in a first accumulator of said set of accumulators;

identifying intervals at which a designated accumulator of said set of accumulators contains a minimum field error value of said field error values stored in said set of accumulators using said processor;

designating said interlaced video material as having a non-interlaced source when said intervals comprise a regular interval using said processor;

converting said interlaced video material to non-interlaced video material using said processor using a first method when said video material is designated as having a non-interlaced source and using a second method when said video material is not designated as having a non-interlaced source.

2. The method of claim 1 wherein said designating step comprises designating said non interlaced source as a film source when said regular interval comprises an interval of five fields.

3. The method of claim 2 further comprising de-designating said non-interlaced source as a film source when said regular interval does not comprise an interval of five fields.

4. The method of claim 1 wherein said pixel values comprise intensity values.

5. The method of claim 1 wherein said subfield comprises a selected area of said video field.

6. The method of claim 1 wherein said step of comparing pixel values comprises determining a sum of absolute values of differences between said pixel values.

7. The method of claim 1 wherein said subfield comprises less than all pixels of a video field.

8. The method of claim 1 wherein said subfield comprises all pixels of a video field.

9. The method of claim 1 wherein said set of accumulators comprises a set of five accumulators.

10. The method of claim 9 wherein said designated accumulator comprises a third accumulator of said set of five accumulators.

* * * * *